US011510052B2

(12) United States Patent
Zhang

(10) Patent No.: US 11,510,052 B2
(45) Date of Patent: Nov. 22, 2022

(54) IDENTITY INFORMATION PROCESSING METHOD, DEVICE, AND SYSTEM

(71) Applicant: Huawei Technologies Co., Ltd., Shenzhen (CN)

(72) Inventor: Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/115,179

(22) Filed: Dec. 8, 2020

(65) Prior Publication Data
US 2021/0195409 A1 Jun. 24, 2021

Related U.S. Application Data

(63) Continuation of application No. PCT/CN2019/094830, filed on Jul. 5, 2019.

(30) Foreign Application Priority Data

Aug. 9, 2018 (CN) .......................... 201810904615.5

(51) Int. Cl.
H04W 12/02 (2009.01)
H04W 12/04 (2021.01)
(Continued)

(52) U.S. Cl.
CPC ........... *H04W 12/04* (2013.01); *H04L 9/0869* (2013.01); *H04L 9/30* (2013.01); *H04L 63/0407* (2013.01);
(Continued)

(58) Field of Classification Search
CPC . H04L 63/04; H04L 63/0407; H04L 63/0421; H04L 63/0428; H04L 63/20;
(Continued)

(56) References Cited

U.S. PATENT DOCUMENTS

2004/0092269 A1\* 5/2004 Kivinen ................. H04L 67/52
455/433
2009/0205046 A1 8/2009 Radosavac et al.
(Continued)

FOREIGN PATENT DOCUMENTS

CN 101969638 A 2/2011
CN 102572815 A 7/2012
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.2.0, Jun. 2018, 217 pages.
(Continued)

*Primary Examiner* — Shaqueal D Wade-Wright
(74) *Attorney, Agent, or Firm* — Slater Matsil, LLP

(57) ABSTRACT

An identity information processing method, a device, and a system, the method including obtaining, by a first network element, a first parameter, where the first parameter is associated with a domain to which a network slice belongs, and determining, by the first network element, according to the first parameter, whether the network slice is managed by an operator.

20 Claims, 9 Drawing Sheets

(51) Int. Cl.
*H04W 12/041* (2021.01)
*H04L 9/08* (2006.01)
*H04L 9/30* (2006.01)
*H04W 8/02* (2009.01)
*H04W 48/16* (2009.01)
*H04L 9/40* (2022.01)

(52) U.S. Cl.
CPC ............... *H04L 63/20* (2013.01); *H04W 8/02* (2013.01); *H04W 12/02* (2013.01); *H04W 12/041* (2021.01); *H04W 48/16* (2013.01)

(58) Field of Classification Search
CPC ........ H04L 9/00; H04W 12/02; H04W 12/72; H04W 12/69
See application file for complete search history.

(56) References Cited

U.S. PATENT DOCUMENTS

| | | | |
|---|---|---|---|
| 2017/0164212 A1 | 6/2017 | Opsenica et al. | |
| 2017/0303259 A1* | 10/2017 | Lee | H04W 28/16 |
| 2019/0098502 A1* | 3/2019 | Torvinen | H04L 9/3242 |
| 2019/0174321 A1* | 6/2019 | Sun | H04W 16/02 |
| 2019/0253885 A1* | 8/2019 | Bykampadi | H04L 63/205 |
| 2020/0057860 A1* | 2/2020 | Patil | G06F 21/6209 |
| 2021/0058783 A1 | 2/2021 | Lei et al. | |
| 2021/0256159 A1* | 8/2021 | Ninglekhu | H04W 4/70 |
| 2021/0337380 A1* | 10/2021 | Ianev | H04W 60/04 |

FOREIGN PATENT DOCUMENTS

| | | |
|---|---|---|
| CN | 107295609 A | 10/2017 |
| CN | 107580324 A | 1/2018 |
| CN | 107819595 A | 3/2018 |
| CN | 108012267 A | 5/2018 |
| CN | 108141756 A | 6/2018 |
| EP | 3481017 A1 | 5/2019 |
| WO | 2017113109 A1 | 7/2017 |
| WO | 2018006784 A1 | 1/2018 |
| WO | 2018128076 A1 | 7/2018 |

OTHER PUBLICATIONS

"3rd Generation Partnership Project; Technical Specification Group Services and System Aspects; Policy and Charging Control Framework for the 5G System; Stage 2 (Release 15)," 3GPP TS 23.503 V15.2.0, Jun. 2018, 67 pages.

* cited by examiner

IDENTITY INFORMATION PROCESSING METHOD, DEVICE, AND SYSTEM

CROSS-REFERENCE TO RELATED APPLICATIONS

This application is a continuation of International Application No. PCT/CN2019/094830, filed on Jul. 5, 2019, which claims priority to Chinese Patent Application No. 201810904615.5, filed on Aug. 9, 2018. The disclosures of the aforementioned applications are hereby incorporated by reference in their entireties.

TECHNICAL FIELD

This application relates to the field of communications technologies, and in particular, to an identity information processing method, a device, and a system.

BACKGROUND

With rapid development of wireless communications technologies, a fifth generation (5G) mobile communications network (5G network for short) emerges. In the 5G network, to meet service requirements of different customers (for example, a service provider or a tenant), a concept of a network slice (NS) is proposed.

The NS is a logically isolated network used to support a specific network capability and a network feature, and may provide an end-to-end (E2E) network service. For example, a terminal may send a request message that carries identity information (for example, a subscription permanent identifier (SUPI)) of the terminal to a network slice, to request a network function (NF) in the network slice to establish a protocol data unit (PDU) session carried on the network slice for the terminal, so that the terminal accesses a data network (DN) session through the PDU session.

However, different network slices belong to different domains. When a network slice belongs to a domain other than an operator domain (for example, a vertical industry security domain), sending identity information of the terminal to the network slice may easily cause a risk of leaking the identity information of the terminal to the vertical industry security domain.

SUMMARY

This application provides an identity information processing method, a device, and a system, to resolve leakage of identity information of a terminal.

To achieve the foregoing objective, this application provides the following technical solutions.

According to a first aspect, this application provides an identity information processing method. The method includes A first network element obtains a first parameter used to determine a domain to which a network slice belongs, and determines, based on the first parameter, whether the network slice is managed by an operator. According to the method, whether the network slice is managed by the operator may be determined, so that when identity information of a terminal is subsequently sent to the network slice, whether to hide the identity information of the terminal is determined based on the determining result. This protects the identity information of the terminal from being leaked. For example, when a network slice is managed by an operator, it indicates that identity information is secure, and identity information of a terminal does not need to be hidden. On the contrary, when the network slice is not managed by the operator, it indicates that the network slice of a terminal is located in a vertical industry security domain and is prone to leakage, and identity information of the terminal needs to be hidden. It should be noted that the network slice may be a network slice that supports access of the terminal.

With reference to the first aspect, in a first possible design of the first aspect, the first network element is any one of a slice selection network element, a network repository network element, and an access and mobility management network element. In this way, whether the network slice is managed by the operator may be determined by using different network elements. This improves determining flexibility.

With reference to the first aspect or the first possible design of the first aspect, in a second possible design of the first aspect, when the first network element is a slice selection network element or a network repository network element, the method further includes The first network element sends indication information to an access and mobility management network element, where the indication information is used to indicate whether the network slice is managed by the operator, or to indicate whether to hide first identity information of the terminal, or to indicate whether the domain to which the network slice belongs and an operator security domain belong to a same security domain. In this way, the access and mobility management network element may determine whether the network slice is managed by the operator by using the indication information sent by another network element.

With reference to any one of the first aspect or the possible designs of the first aspect, in a third possible design of the first aspect, the first parameter includes at least one of network slice selection assistance information (NSSAI) corresponding to the network slice, a tracking area identity (TAI) of the terminal, and a service type of the terminal.

When the first network element is a slice selection network element, the first network element may receive the first parameter sent by the access and mobility management network element, where the first parameter may be included in a slice selection request.

When the first network element is a network repository network element, the first network element may receive the first parameter sent by the access and mobility management network element, where the first parameter may be included in an NF discovery request.

When the first network element is an access and mobility management network element, the first network element may receive the first parameter sent by the terminal, where the first parameter may be included in a session establishment request, a session update request, or a registration request.

According to a second aspect, this application provides a communications apparatus. The communications apparatus may be a first network element in a communications network, and the first network element may be a slice selection network element, or a chip or a system-on-a-chip in the slice selection network element. The first network element may alternatively be a network repository network element, or a chip or a system-on-a-chip in the network repository network element. The first network element may alternatively be an access and mobility management network element, or a chip or a system-on-a-chip in the access and mobility management network element. The communications apparatus may implement a function performed by the communications apparatus in the foregoing aspects or the possible designs. The function may be implemented by hardware, or may be implemented by hardware executing corresponding software. The hardware or the software includes one or more modules corresponding to the foregoing function. For example, the communications apparatus may include an obtaining unit and a determining unit.

The obtaining unit is configured to obtain a first parameter used to determine a domain to which a network slice belongs.

The determining unit is configured to determine, based on the first parameter, whether the network slice is managed by an operator.

For a specific implementation of the communications apparatus, refer to actions of the communications apparatus in the identity information processing method provided in any one of the first aspect or the possible designs of the first aspect. Details are not described herein again. Therefore, the provided communications apparatus can achieve a same beneficial effect as the first aspect or the possible designs of the first aspect.

According to a third aspect, a communications apparatus is provided, where the communications apparatus includes a processor and a memory. The memory is configured to store a computer-executable instruction, and when the communications apparatus runs, the processor executes the computer-executable instruction stored in the memory, and the communications apparatus is enabled to perform the identity information processing method according to any one of the first aspect or the possible designs of the first aspect.

According to a fourth aspect, a computer-readable storage medium is provided. The computer-readable storage medium stores an instruction, and when the instruction is run on a computer, the computer is enabled to perform the identity information processing method according to any one of the first aspect or the possible designs of the first aspect.

According to a fifth aspect, a computer program product including an instruction is provided. When the computer program product runs on a computer, the computer is enabled to perform the identity information processing method according to any one of the first aspect or the possible designs of the first aspect.

According to a sixth aspect, a chip system is provided. The chip system includes a processor and a communications interface, and is configured to support a communications apparatus to implement a function in the foregoing aspects. For example, the processor obtains a first parameter used to determine a domain to which a network slice belongs, and determines, based on the first parameter, whether the network slice is managed by an operator. In a possible design, the chip system further includes a memory. The memory is configured to store a program instruction and data that are necessary for the communications apparatus. The chip system may include a chip, or may include a chip and another discrete component.

For a technical effect achieved in any one of the third aspect to the sixth aspect, refer to the technical effect achieved in any one of the first aspect or the possible designs of the first aspect. Details are not described herein again.

According to a seventh aspect, this application provides another identity information processing method. The method includes A second network element determines whether to hide first identity information of a terminal, and when the second network element determines to hide the first identity information of the terminal, the second network element hides the first identity information to obtain second identity information, and sends the second identity information to a session management network element. According to the method, the second network element may hide identity information of the terminal that needs to be hidden, and then send the hidden identity information to the session management network element. This protects the identity information of the terminal from being leaked when being sent to a vertical industry security domain.

With reference to the seventh aspect, in a first possible design of the seventh aspect, the second network element is any one of an access and mobility management network element, a security edge protection proxy, and a visited session management network element. In this way, the identity information of the terminal can be hidden by using different network elements. This improves flexibility of hiding the identity information of the terminal.

With reference to the seventh aspect or the first possible design of the seventh aspect, in a second possible design of the seventh aspect, that a second network element determines whether to hide first identity information of a terminal includes The second network element receives indication information, and determines whether to hide the first identity information of the terminal based on the indication information, where the indication information is used to indicate whether a network slice is managed by an operator, or the indication information is used to indicate whether to hide the first identity information of the terminal, or the indication information is used to indicate whether a domain to which a network slice belongs and an operator security domain belong to a same security domain.

It should be noted that when the second network element is an access and mobility management network element, the second network element may determine whether the network slice is managed by the operator, and determine whether to hide the first identity information of the terminal based on a determining result of the second network element.

According to the seventh aspect or any possible design of the seventh aspect, in a third possible design of the seventh aspect, that the second network element hides the first identity information to obtain second identity information includes The second network element encrypts the first identity information of the terminal by using a public key to obtain the second identity information, or the second network element encrypts the first identity information of the terminal by using a shared key to obtain the second identity information, or the second network element obtains a new key based on a shared key and a key derivation function, and encrypts the first identity information of the terminal by using the new key to obtain the second identity information, or the second network element randomizes the first identity information of the terminal to obtain the second identity information, or the second network element uses a GPSI corresponding to the first identity information of the terminal as the second identity information. In this way, identity information of the terminal may be hidden in a plurality of manners. This improves hiding flexibility.

According to an eighth aspect, this application provides a communications apparatus. The communications apparatus may be a second network element in a communications network, where the second network element may be a security edge protection proxy, or a chip or a system-on-a-chip in the security edge protection proxy. The second network element may alternatively be a visited session management network element, or a chip or a system-on-a-chip in the visited session management network element. The second network element may alternatively be an access and mobility management network element, or a chip or a system-on-a-chip in the access and mobility management network element. The communications apparatus may implement a function performed by the communications apparatus in the seventh aspect or each possible design of the seventh aspect. The function may be implemented by hardware, or may be implemented by hardware executing corresponding software. The hardware or the software includes one or more modules corresponding to the foregoing function. For example, the communications apparatus may include a determining unit, a hiding unit, and a sending unit.

The determining unit is configured to determine whether to hide first identity information of a terminal, the hiding unit is configured to when the first identity information of the terminal is determined to be hidden, hide the first identity information to obtain second identity information, and the sending unit is configured to send the second identity information to a session management network element.

For a specific implementation of the communications apparatus, refer to actions of the communications apparatus in the identity information processing method provided in any one of the seventh aspect or the possible designs of the seventh aspect. Details are not described herein again. Therefore, the provided communications apparatus can achieve a same beneficial effect as the seventh aspect or the possible designs of the seventh aspect.

According to a ninth aspect, a communications apparatus is provided, where the communication apparatus includes a processor and a memory. The memory is configured to store a computer-executable instruction, and when the communications apparatus runs, the processor executes the computer-executable instruction stored in the memory, and the communications apparatus is enabled to perform the identity information processing method according to any one of the seventh aspect or the possible designs of the seventh aspect.

According to a tenth aspect, a computer-readable storage medium is provided. The computer-readable storage medium stores an instruction, and when the instruction is run on a computer, the computer is enabled to perform the identity information processing method according to any one of the seventh aspect or the possible designs of the seventh aspect.

According to an eleventh aspect, a computer program product including an instruction is provided. When the computer program product runs on a computer, the computer is enabled to perform the identity information processing method according to any one of the seventh aspect or the possible designs of the seventh aspect.

According to a twelfth aspect, a chip system is provided. The chip system includes a processor and a communications interface, and is configured to support a communications apparatus in implementing a function in the foregoing aspects. For example, the processor determines whether to hide first identity information of a terminal, and when the first identity information of the terminal is determined to be hidden, hides the first identity information to obtain second identity information, and sends the second identity information to a session management network element through the communications interface. In a possible design, the chip system further includes a memory. The memory is configured to store a program instruction and data that are necessary for the communications apparatus. The chip system may include a chip, or may include a chip and another discrete component.

For a technical effect achieved in any one of the ninth aspect to the twelfth aspect, refer to the technical effect achieved in any one of the seventh aspect or the possible designs of the seventh aspect. Details are not described herein again.

According to a thirteenth aspect, this application provides an identity information processing method. The method includes A third network element receives identity information of a terminal and an indication used to indicate that identity information of the terminal is hidden identity information that are sent by a session management network element, the third network element sends a decryption request to a decryption functional entity based on the indication, where the decryption request includes the identity information of the terminal, and the decryption request is used to request to decrypt the identity information of the terminal, and the third network element receives decrypted identity information from the decryption functional entity, obtains data corresponding to the decrypted identity information, and sends the data to the session management network element. According to the method, when the identity information received by the third network element is the hidden identity information, the third network element requests the decryption functional entity to decrypt the hidden identity information to obtain the data corresponding to the decrypted identity information, and sends the obtained data to the session management network element. In this way, the session management network element implements service transmission in a PDU session based on the received data. This avoids leakage of identity information of the terminal while ensuring service transmission continuity.

With reference to the thirteenth aspect, in a first possible design of the thirteenth aspect, the third network element is any one of a policy control network element, a charging network element, and a data management network element. In this way, after receiving the hidden identity information, different network elements may request another network element to decrypt the identity information of the terminal.

With reference to the thirteenth aspect or the first possible design of the thirteenth aspect, in a second possible design of the thirteenth aspect, the decryption functional entity is any one of an access and mobility management network element, the data management network element, a network repository network element, the charging network element, the policy control network element, and an authentication network element. In this way, the different network elements can decrypt the hidden identity information of the terminal. This improves flexibility of decrypting the identity information of the terminal.

With reference to any one of the thirteenth aspect or the possible designs of the thirteenth aspect, in a second possible design of the thirteenth aspect, the method further includes The third network element sends information corresponding to hidden second identity information to the session management network element, so that the session management network element stores the hidden second identity information and the information corresponding to second identity information. In this way, when notifying the session management network element to send the information, the third network element may directly send the hidden identity information to the session management network element, and does not need to decrypt the hidden identity information by using the decryption functional entity, and then send the information to the session management network element. This reduces processing power consumption of the third network element and signaling overheads between the third network element and another network element.

According to a fourteenth aspect, this application provides a communications apparatus. The communications apparatus may be a third network element in a communications network, and the third network element may be a policy control network element, or a chip or a system-on-a-chip in the policy control network element. The third network element may alternatively be a charging network element, or a chip or a system-on-a-chip in the charging network element. The third network element may alternatively be a data management network element, or a chip or a system-on-a-chip in the data management network element. The communications apparatus may implement a function performed by the communications apparatus in the thirteenth aspect or each possible design of the thirteenth aspect. The function may be implemented by hardware, or may be implemented by hardware executing corresponding software. The hardware or the software includes one or more modules corresponding to the foregoing function. For example, the communications apparatus may include a receiving unit, a sending unit, and an obtaining unit.

The receiving unit is configured to receive identity information of a terminal and an indication used to indicate that the identity information of the terminal is hidden identity information that are sent by a session management network element.

The sending unit is configured to send a decryption request to a decryption functional entity based on the indication, where the decryption request includes the identity information of the terminal, and the decryption request is used to request to decrypt the identity information of the terminal.

The receiving unit is further configured to receive decrypted identity information from the decryption functional entity.

The obtaining unit is configured to obtain data corresponding to the decrypted identity information.

The sending unit is further configured to send the data to the session management network element.

For a specific implementation of the communications apparatus, refer to actions of the communications apparatus in the identity information processing method provided in any one of the thirteenth aspect or the possible designs of the thirteenth aspect. Details are not described herein again. Therefore, the provided communications apparatus can achieve a same beneficial effect as the thirteenth aspect or the possible designs of the thirteenth aspect.

According to a fifteenth aspect, a communications apparatus is provided, where the communications apparatus includes a processor and a memory. The memory is configured to store a computer-executable instruction, and when the communications apparatus runs, the processor executes the computer-executable instruction stored in the memory, and the communications apparatus is enabled to perform the identity information processing method according to any one of the thirteenth aspect or the possible designs of the thirteenth aspect.

According to a sixteenth aspect, a computer-readable storage medium is provided. The computer-readable storage medium stores an instruction, and when the instruction is run on a computer, the computer is enabled to perform the identity information processing method according to any one of the thirteenth aspect or the possible designs of the thirteenth aspect.

According to a seventeenth aspect, a computer program product including an instruction is provided. When the computer program product runs on a computer, the computer is enabled to perform the identity information processing method according to any one of the thirteenth aspect or the possible designs of the thirteenth aspect.

According to an eighteenth aspect, a chip system is provided. The chip system includes a processor and a communications interface, and is configured to support a communications apparatus to implement a function in the foregoing aspects. For example, the processor receives identity information of a terminal and an indication used to indicate that the identity information of the terminal is hidden identity information that are sent by a session management network element, sends a decryption request to a decryption functional entity based on the indication, where the decryption request includes the identity information of the terminal, and the decryption request is used to request to decrypt the identity information of the terminal, receives decrypted identity information from the decryption functional entity, obtains data corresponding to the decrypted identity information, and sends the data to the session management network element. In a possible design, the chip system further includes a memory. The memory is configured to store a program instruction and data that are necessary for the communications apparatus. The chip system may include a chip, or may include a chip and another discrete component.

For a technical effect achieved in any one of the fifteenth aspect to the eighteenth aspect, refer to the technical effect achieved in any one of the thirteenth aspect or the possible designs of the thirteenth aspect. Details are not described herein again.

According to a nineteenth aspect, this application provides an identity information processing system, including the first network element according to the second aspect to the sixth aspect, the second network element according to the eighth aspect to the twelfth aspect, and the third network element according to the fourteenth aspect to the eighteenth aspect.

DETAILED DESCRIPTION OF ILLUSTRATIVE EMBODIMENTS

First of all, to facilitate understanding of the embodiments of this application, some technical terms in the embodiments of this application are described.

NS is a logical network with a specific network feature. Different network slices (NSes) are logically isolated from each other. A network slice may flexibly provide one or more network services based on a requester's requirement. A network slice is identified by single network slice selection assistance information (S-NSSAI).

Network slice selection assistance information (NSSAI) is used to indicate one or more network slices, where the NSSAI includes a plurality of single NSSAIs (S-NSSAI). The S-NSSAI includes parameters such as a slice/service type (SST) and a slice differentiator (SD). The SST includes a standard type and a type customized by an operator. The SD is optional information used to supplement the SST, to distinguish between a plurality of network slices of a same SST. It should be noted that in the embodiments of this application, the NSSAI may be referred to as network slice information for short.

Operator security domain is a network managed by an operator.

Vertical industry security domain is a network other than an operator security domain, in other words, a network that is not managed by the operator. In the embodiments of this application, the vertical industry security domain may be referred to as a service management domain, a service security domain, or the like. One possible deployment manner is that a vertical industry security domain and an operator security domain communicate with each other through a security edge protection proxy (SEEP). For example, an SEEP 1 is deployed at an edge of a vertical industry security domain, an SEEP 2 is deployed at an edge of an operator security domain. A network function (NF) in the vertical industry security domain may send information to the SEEP 2 in the operator security domain through the SEEP 1. After receiving the information sent by the SEEP 1, the SEEP 2 sends the received information to the NF in the operator security domain.

The following describes the technical solutions in the embodiments of this application with reference to the accompanying drawings in the embodiments of this application.

Figure 1:
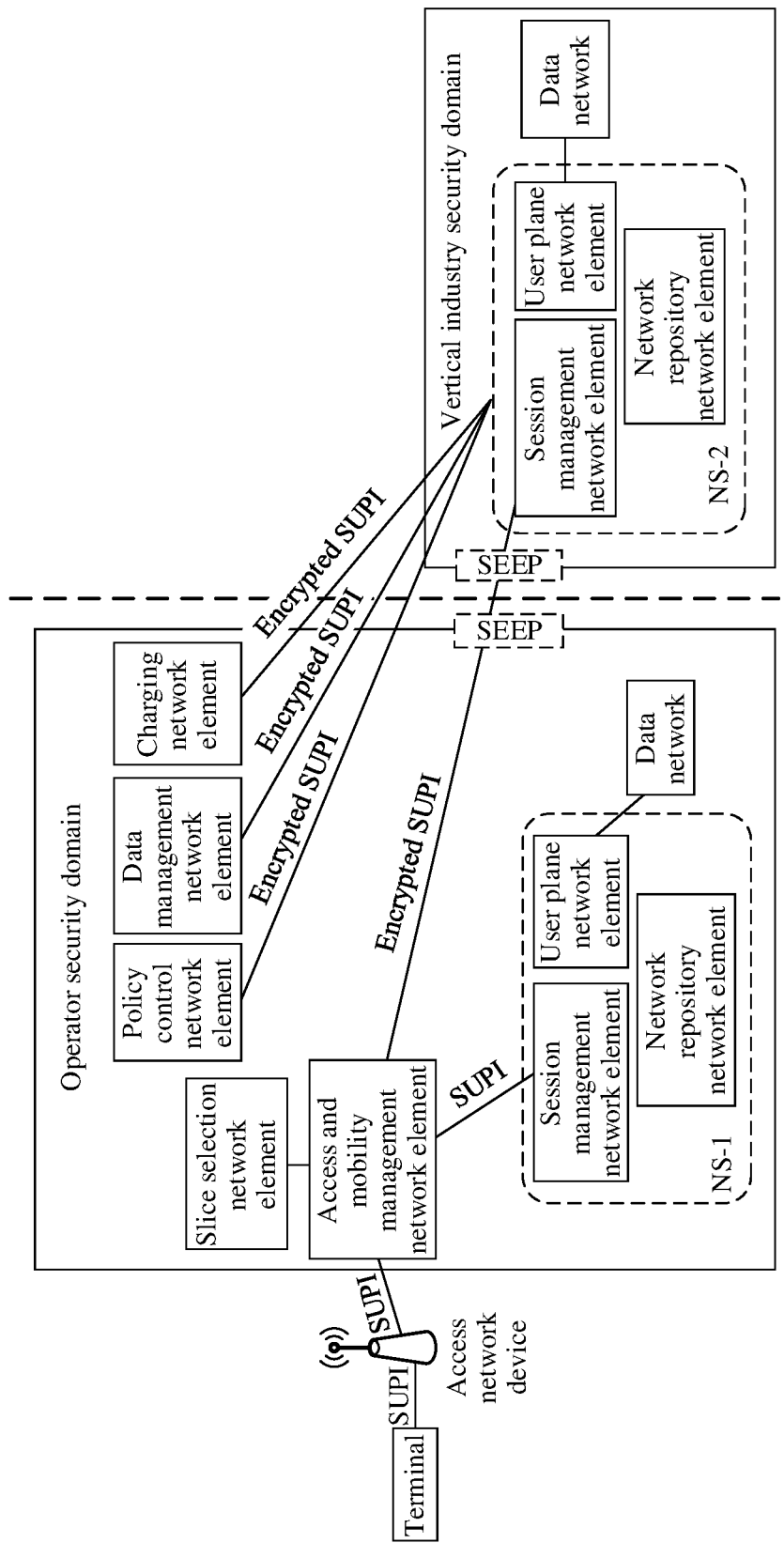
FIG. 1 is a schematic diagram of a system architecture according to an embodiment of this application.

The technical solutions provided in this application may be applied to a network shown in FIG. 1, and the network may be a 5G network. As shown in FIG. 1, the network may include a terminal, an access network device, an access and mobility management network element, a plurality of network slices (for example, an NS-1 and an NS-2 in FIG. 1), a slice selection network element, a policy control network element, a data management network element, a charging network element, a data network (DN), and the like. Each network slice includes a set of different network functions and physical resources, and may be used to carry a PDU session, so that the terminal accesses the data network through the PDU session. In a possible structure, a network slice includes a network repository network element, a plurality of management network elements, and a plurality of user plane network elements. Network slices are isolated from each other, and a plurality of network slices may share a same slice selection network element, an access and mobility management network element, a data management network element, a policy control network element, and a charging network element. In FIG. 1, different network slices may all be located in an operator security domain and managed by an operator, or may be deployed on a network other than an operator network. For example, in FIG. 1, an NS-1 is located in an operator security domain, and an NS-2 is located in a vertical service security domain. In FIG. 1, an SEEP may be deployed at an edge of each domain. The SEEP is a communications interface of the domain, and has a function of receiving and sending data or information. NFs in different domains may communicate with each other through the SEEP. It should be noted that the network architecture shown in FIG. 1 is merely an example diagram of an architecture. Although not shown, in addition to the network function shown in FIG. 1, the network shown in FIG. 1 may include another function, for example, an authentication network element (for example, an authentication server function (AUSF)), and an authentication credential repository and processing function (Authentication Credential Repository and Processing Function, ARPF).

The terminal in FIG. 1 may be user equipment (UE), or may be various handheld devices, vehicle-mounted devices, wearable devices, or computing devices that have a wireless or wired communication function, or other processing devices connected to a wireless modem. The terminal may further include a subscriber unit, a cellular phone, a smart phone, a wireless data card, a personal digital assistant (PDA) computer, a tablet computer, a wireless modem, a handheld device (handheld), a laptop computer, a cordless phone, or a wireless local loop (WLL) station, a machine type communication (MTC) terminal, a mobile station (MS), or the like. This is not limited in the embodiments of this application.

The access network device in FIG. 1 is mainly configured to implement functions such as a physical layer function, resource scheduling, radio resource management, access control, and mobility management. The access network device may alternatively be a next generation NodeB (gNB), or any other access unit. The access network device may alternatively be another access network device with a specific wired network function.

The slice selection network element in FIG. 1 has a function of selecting a network slice and identifying an attribute of the network slice, and is mainly configured to select an appropriate network slice for the terminal based on information such as NSSAI requested by the terminal and/or NSSAI subscribed by the terminal, determine whether the selected network slice is managed by an operator, and the like. Specifically, the slice selection network element may be a network slice selection function (NSSF).

The access and mobility management network element in FIG. 1 mainly implements access control and mobility management functions for the terminal, and may be configured to protect identity information (for example, an SUPI of the terminal) of the terminal. Specifically, the access and mobility management network element may be an access and mobility management function (AMF).

The network repository network element in FIG. 1 stores a profile (profile) of each network function (NF) on the network, a service supported by the NF, and is mainly configured to discover the NF, determine whether a network on which the discovered NF is located is managed by the operator, and the like. Specifically, the network repository network element may be a network repository function (NRF).

The session management network element in FIG. 1 is mainly configured to implement session management functions such as establishment, release, and change of a user plane transmission path, and may further be configured to hide the identity information of the terminal sent to a home session management network element when the session management network element is a visited session management network element of the terminal. Specifically, the session management network element may be a session management function (SMF).

The user plane network element in FIG. 1 is mainly responsible for implementing functions such as routing and forwarding of user plane data. For example, the user plane network element is responsible for data packet filtering, data transmission/forwarding, rate control, charging information generation, and the like for the terminal. Specifically, the user plane network element may be a user plane function (UPF).

The policy control network element in FIG. 1 is mainly configured to formulate a policy and charging control rule (PCC rule) related to the terminal, and may further be configured to after receiving hidden identity information sent by the session management network element, obtain original identity information corresponding to the hidden identity information, and deliver data corresponding to the original identity information to the session management network element. Specifically, the policy control network element may be a policy control function (PCF).

The data management network element in FIG. 1 is mainly configured to store subscription data and related information of the terminal, and may further be configured to after receiving the hidden identity information sent by the session management network element, obtain the original identity information corresponding to the hidden identity information, and deliver the data corresponding to the original identity information to the session management network element. Specifically, the data management network element may be unified data management (UDM).

The charging network element in FIG. 1 is mainly configured to implement charging on traffic of the terminal and the like, and may further be configured to after receiving the hidden identity information sent by the session management network element, obtain the original identity information corresponding to the hidden identity information, and deliver the data corresponding to the original identity information to the session management network element. Specifically, the charging network element may be a charging control function (CHF).

It should be noted that names of the network elements in the foregoing architectures are merely examples, and the network elements in specific implementation may have other names. This is not specifically limited in the embodiments of this application. The following describes an identity information processing method provided in this application by using an example in which in FIG. 1 of a 5G network, the access and mobility management network element is an AMF, the slice selection network element is an NSSF, the network repository network element is an NRF, the session management network element is an AMF, the policy control network element is a PCF, the data management network element is a UDM, and the charging network element is a CHF.

Figure 2A:
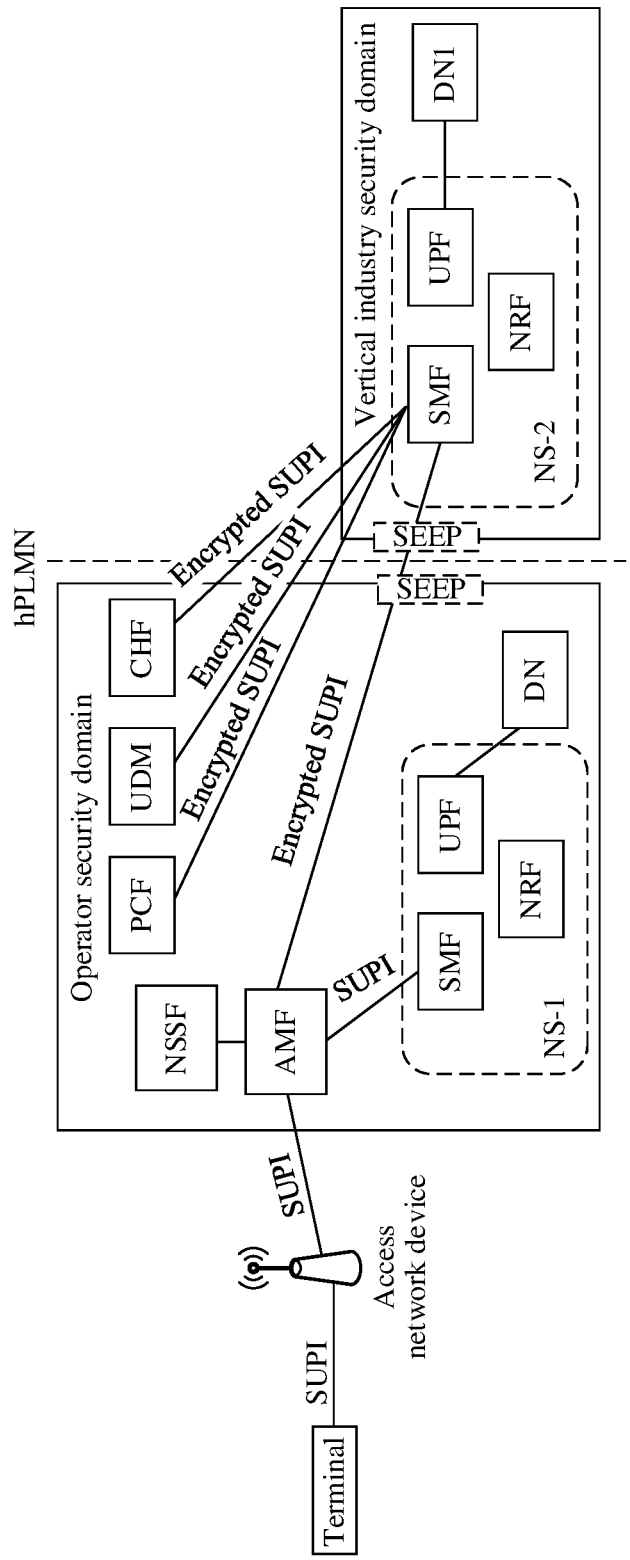
FIG. 2a is a schematic diagram of a system architecture in a non-roaming scenario according to an embodiment of this application.

FIG. 2a is a diagram of a system architecture in which a terminal is in a non-roaming scenario. In FIG. 2a, the terminal is located in a home public land mobile network (HPLMN, hPLMN), and the terminal may access a DN by using an NS in the hPLMN. For example, the terminal may access a DN 1 by using an NS-2 in the hPLMN.

Figure 2B:
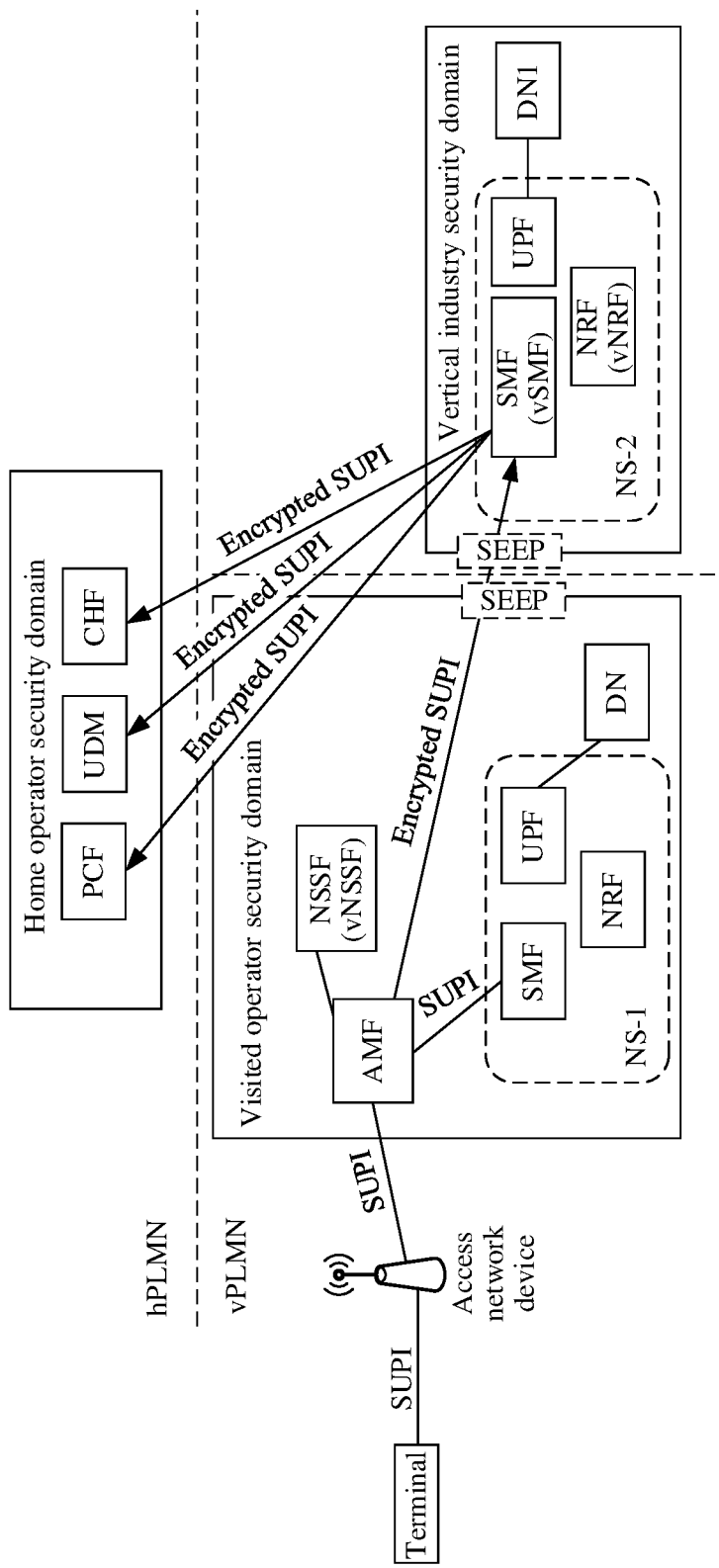
FIG. 2b is a schematic diagram of a system architecture in a LOB roaming scenario according to an embodiment of this application.
Figure 2C:
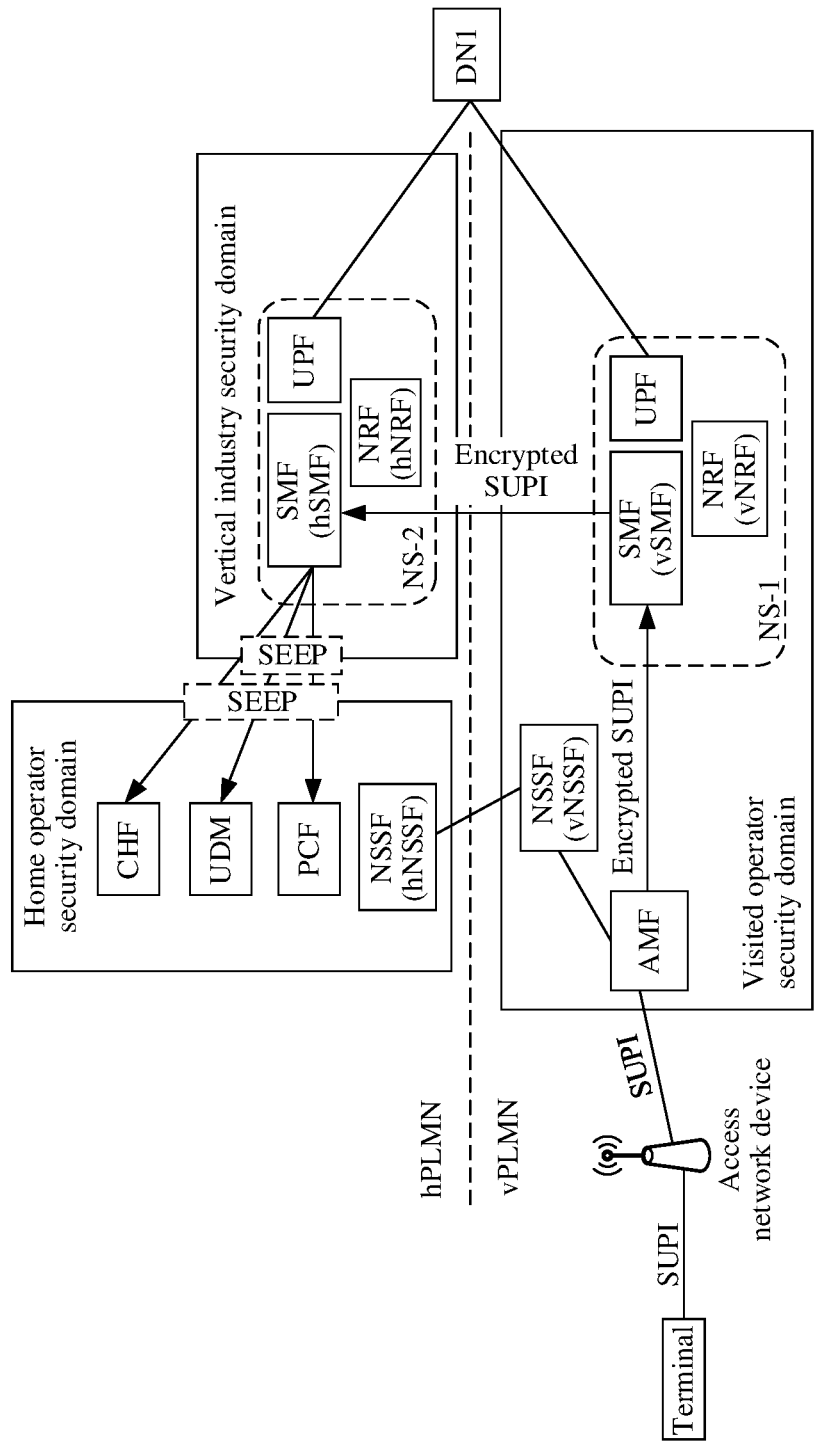
FIG. 2c is a schematic diagram of a system architecture in a home-routed roaming scenario according to an embodiment of this application.

Due to mobility of the terminal device, when moving on a 5G network, the terminal device may be in a local breakout (LBO) roaming scenario shown in FIG. 2b or a home-routed roaming scenario shown in FIG. 2c. LBO roaming may mean that a roaming terminal accesses a network by using a network slice in a visited location to obtain a corresponding service, and a service provider may be a visited public land mobile network (vPLMN). For example, as shown in FIG. 2b, the terminal accesses the DN 1 by using an SMF (namely, a vSMF) in the vPLMN to obtain the corresponding service, and terminal plane traffic of all access services is reported to a PCF (namely, an hPCF) in the hPLMN through a vSMF in the vPLMN. In other words, in the local breakout roaming scenario, an SMF that serves the terminal is located in a visited location.

Home-routed roaming means that the visited SMF is connected to a home SMF over a home route for control signaling transmission, and a home network slice is connected to a data network. For example, as shown in FIG. 2c, the vSMF is the visited SMF, and the hSMF is the visited SMF, the terminal may send a message to the hSMF through the vSMF, and the hSMF may upload the received message to the PCF, the CHF, the UDM, or the like.

In the systems shown in FIG. 1 to FIG. 2c, to prevent identity information (for example, an SUPI) of the terminal from being leaked to a vertical industry security domain, before the terminal accesses the network slice, whether the network slice is managed by an operator is determined. When the network slice is managed by the operator (for example, when the network slice is located in the vertical industry security domain), the identity information of the terminal is hidden, in other words, the identity information of the terminal is encrypted. When the identity information of the terminal is subsequently sent to the network slice, the encrypted identity information is sent. This protects the identity information of the terminal from being leaked to the vertical industry security domain. After receiving the encrypted identity information, some network elements (such as the PCF, the CHF, or the UDM) in the network decrypt the received identity information, to obtain data corresponding to the decrypted identity information. The foregoing operation of hiding the identity information of the terminal may be processing the identity information of the terminal in a randomized manner. Specifically, for the method, refer to FIG. 4 to FIG. 8.

Figure 3:
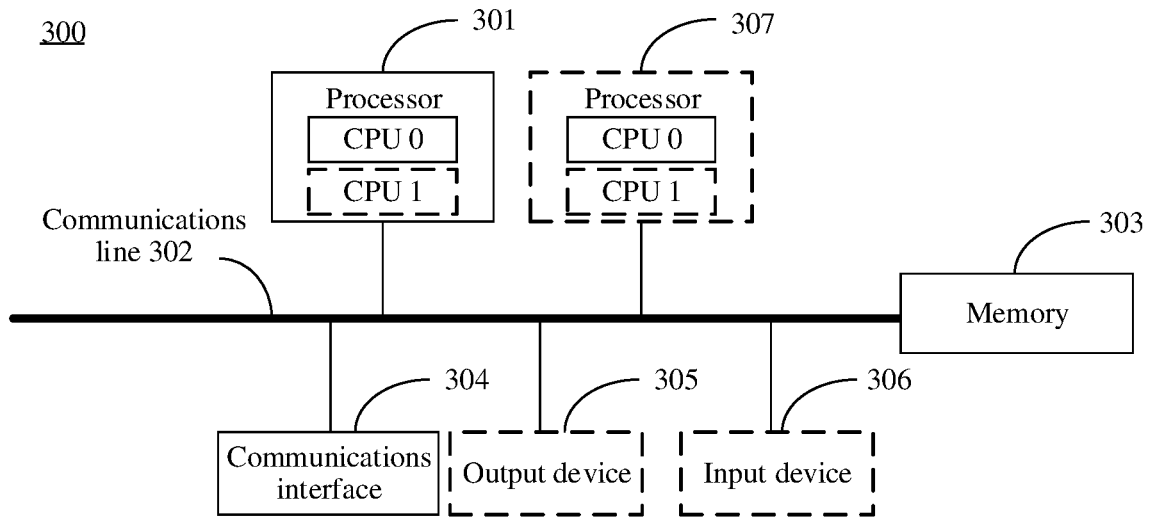
FIG. 3 is a schematic composition diagram of a communications apparatus according to an embodiment of this application.

To implement the identity information processing method provided in this embodiment of this application, the network elements in the foregoing network may include components shown in FIG. 3. FIG. 3 is a schematic composition diagram of a communications apparatus according to an embodiment of this application. As shown in FIG. 3, the communications apparatus 300 includes at least one processor 301, a communications line 302, and at least one communications interface 304, and may further include a memory 303. The processor 301, the memory 303, and the communications interface 304 may be connected to each other through the communications line 302.

The processor 301 may be a central processing unit (CPU), or an application-specific integrated circuit (ASIC), or may be configured as one or more integrated circuits implementing this embodiment of this application, for example, one or more digital signal processors (DSP) or one or more field programmable gate arrays (FPGA).

The communications line 302 may include a path used to transfer information between the foregoing components.

The memory 303 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 303 is not limited thereto. The memory 303 may exist independently, and is connected to the processor 301 through the communications line 302. Alternatively, the memory 303 may be integrated with the processor 301. The memory 303 is configured to store an execution instruction or application program code, and the processor 301 controls execution, to implement the identity information processing method provided in the following embodiments of this application.

The communications interface 304 may be configured to communicate with another device or communications network, such as the Ethernet, a radio access network (Radio Access Network, RAN), or a wireless local area network (Wireless Local Area Networks, WLAN) through any apparatus such as a transceiver.

In a possible implementation, the processor 301 may include one or more CPUs, for example, a CPU 0 and a CPU 1 in FIG. 3. In another implementation, the communications apparatus 300 may include a plurality of processors, for example, the processor 301 and a processor 307 in FIG. 3. In still another implementation, the communications apparatus 300 may further include an output device 305 and an input device 306.

It should be noted that the communications apparatus 300 may be a general-purpose device or a dedicated device. For example, the communications device 300 may be a desktop computer, a portable computer, a network server, a PDA, a mobile phone, a tablet computer, a wireless terminal, an embedded device, or a device with a structure similar to that in FIG. 3. A type of the communications apparatus 300 is not limited in this embodiment of this application.

With reference to FIG. 2a to FIG. 2c, the following specifically describes the identity information processing method provided in the embodiments of this application. It should be noted that in the following embodiments of this application, names of messages between network elements, names of parameters in messages, or the like are merely examples, and there may be other names in specific implementation. This is not specifically limited in this embodiment of this application.

Figure 4:
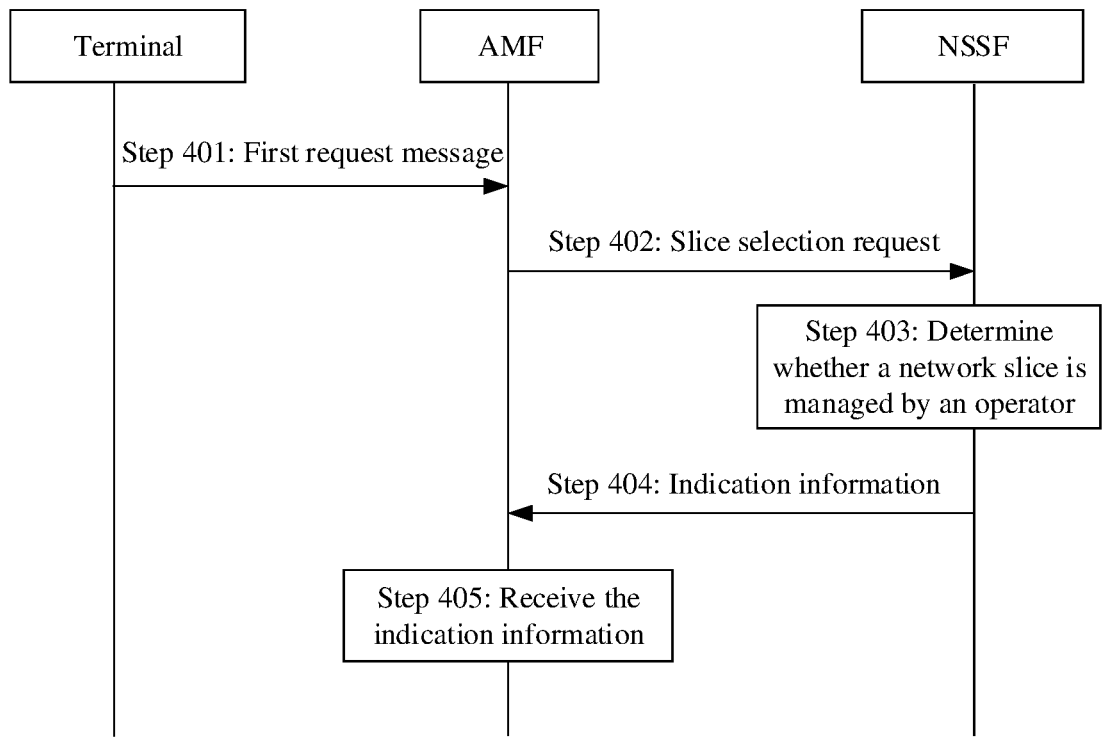
FIG. 4 is a flowchart of an identity information processing method according to an embodiment of this application.

FIG. 4 is a flowchart of an identity information processing method according to an embodiment of this application. The method may be applied to the scenario shown in FIG. 2a, FIG. 2b, or FIG. 2c. When the method is applied to the scenario shown in FIG. 2a, an AMF and an NSSF in the method may be a home AMF (namely, an hAMF) and a home NSSF (namely, an hNSSF). When the method is applied to the scenario shown in FIG. 2b, the AMF and the NSSF in the method may be a visited AMF (namely, a vAMF) and a visited NSSF (namely, a vNSSF) in FIG. 2b. When the method is applied to the scenario shown in FIG. 2c, the AMF and the NSSF in the method may be a visited AMF (namely, a vAMF) and a home NSSF (namely, an hNSSF) in FIG. 2c. As shown in FIG. 4, the method may include the following steps.

Step 401: A terminal sends a first request message to the AMF.

The AMF may be a default AMF. The terminal may send the first request message to the AMF by using an access network device.

The first request message may be used to request the AMF to establish network access for the terminal, and may further be used to indicate the AMF to hide identity information of the terminal sent to a network slice when the network slice is located in a vertical industry security domain.

The first request message may be a session establishment request, a session update request, or a registration request. This is not limited. The first request message may include first identity information of the terminal and NSSAI requested by the terminal, and may further include other information, for example, a device type of the terminal, a service identifier of the terminal, and a service type parameter of the terminal. The first request message may further include a hidden indication, and the hidden instruction may be used to indicate the AMF to hide the identity information of the terminal sent to the network slice when the network slice is located in the vertical industry security domain. It should be noted that the first request message may alternatively not include the hidden indication. When receiving the first request message that includes the first identity information of the terminal, the AMF hides the first identity information of the terminal sent to the network slice by default when the network slice is located in the vertical industry security domain.

In the embodiments of this application, the first identity information of the terminal may be a subscription permanent identifier (SUPI) of the terminal, an international mobile subscriber identity (IMSI) of the terminal, a globally unique temporary identity (GUTI) of the terminal, or a temporary mobile subscriber identity (TMSI) of the terminal (for example, a system architecture evolution temporary mobile subscriber identity (S-TMSI), or a mobility management function temporary mobile subscriber identity (M-TMSI), or a packet-switched temporary subscriber identity (P-TMSI)), or an IP multimedia private identity (IMPI) of the terminal, or an IP multimedia public identity (IMPU) of the terminal, or an international mobile station equipment identity (International Mobile Station Equipment Identity, IMEI) of the terminal. This is not limited in the embodiments of this application.

Step 402: The AMF receives the first request message, and sends a slice selection request to the NSSF.

The slice selection request may be used to request the NSSF to select a network slice that supports access of the terminal. The slice selection request may include the NSSAI requested by the terminal, and may further include one or more pieces of information of a public land mobile network identity (PLMN ID) corresponding to the SUPI of the terminal, and a tracking area identity (TAI) of the terminal, the device type of the terminal, the service identifier of the terminal, and the service type parameter of the terminal.

Optionally, in step 402, after the AMF receives the first request message, if the AMF cannot select an appropriate network slice for the terminal, the AMF sends the slice selection request to the NSSF. If the AMF can select the appropriate network slice for the terminal, the AMF does not send the slice selection request to the NSSF. Specifically, the AMF may determine whether the AMF can select the appropriate network slice for the terminal by using the prior art. Details are not described in this embodiment of this application.

When the method shown in FIG. 4 is applied to the scenario shown in FIG. 2a or FIG. 2b, the AMF may directly send the slice selection request to the NSSF through a communications interface (for example, a service-based interface Nnssf) between the AMF and the NSSF. When the method shown in FIG. 4 is applied to the scenario shown in FIG. 2c, as shown in FIG. 2c, the AMF may send a slice selection request to the vNSSF. After receiving the slice selection request, the vNSSF forwards the slice selection request to the hNSSF. It should be noted that both the slice selection request sent by the AMF to the vNSSF and the slice selection request sent by the vNSSF to the hNSSF carry the NSSAI requested by the terminal. In addition to the NSSAI, information carried in the slice selection request sent by the AMF to the vNSSF may be the same as or different from information carried in the slice selection request sent by the vNSSF to the hNSSF.

Step 403: The NSSF receives the slice selection request, and determines whether the network slice is managed by an operator.

The network slice in step 403 may be a network slice that is selected by the NSSF and that supports the access of the terminal. Specifically, for a process in which the NSSF selects the network slice, refer to the prior art. Details are not described in this embodiment of this application.

Whether the network slice is managed by the operator may be whether the network slice is located in an operator security domain, or whether a domain to which the network slice belongs and the operator security domain belong to a same security domain. For example, if a network slice of a terminal is located in an operator security domain, it indicates that the network slice is managed by an operator. On the contrary, a network slice is located outside an operator security domain (in other words, located in a vertical industry security domain), and the network slice is not managed by an operator.

It should be noted that, in this application, the following four descriptions provided relate to a same concept, whether the network slice is managed by the operator, whether the network slice is located in the operator security domain, whether the identity information sent to the network slice needs to be hidden (or protected), whether identity information sent to an NF (for example, an SMF) in the network slice needs to be hidden (or protected), and whether the domain to which the network slice belongs and the operator security domain belong to a same security domain. The four descriptions may be interchanged. For example, "determining whether the network slice is managed by an operator" may be described as "determining whether identity information sent to an NF (for example, an SMF) in the network slice needs to be hidden", or may be described as "determining whether a domain to which the network slice belongs and an operator security domain belong to a same security domain", and may alternatively be described as "determining whether the network slice is located in an operator security domain". In addition, "whether the network slice is managed by an operator" may be indirectly expressed by using another description language, in other words, description in a language that can be used to express "whether the network slice is managed by an operator" also falls within the protection scope of this application.

In a possible design, the NSSF determines, based on a correspondence between the NSSAI and the domain to which the network slice belongs, whether the network slice is managed by the operator. The domain to which the network slice belongs includes the operator security domain or the vertical industry security domain. For example, NSSAI 1 corresponds to the operator security domain, and NSSAI 2 corresponds to the vertical industry security domain. When the NSSAI corresponding to the network slice selected by the NSSF is the NSSAI 2, it is determined that the network slice is located in the vertical industry security domain and is not managed by the operator. Alternatively, the NSSAI includes an indication used to indicate whether the network slice corresponding to the NSSAI belongs to the operator security domain, and the NSSF may directly determine whether the network slice is managed by the operator based on the indication. For example, when the indication is used to indicate that the network slice corresponding to the NSSAI does not belong to the operator security domain, the NSSF determines that the network slice is not located in the operator security domain, but is located in the vertical industry security domain.

In another possible design, the slice selection request includes the TAI of the terminal. If the TAI of the terminal indicates that the terminal is located in the vertical industry security domain, the NSSF determines that the network slice is managed by the operator based on the TAI of the terminal. Otherwise, the NSSF determines that the network slice is not managed by the operator.

In still another possible design, the slice selection request includes the service type of the terminal. If the service type of the terminal indicates that a service of the terminal belongs to a vertical industry service category, the NSSF determines that the network slice is managed by the operator based on the service type of the terminal. Otherwise, the NSSF determines that the network slice is not managed by the operator.

Optionally, the network slice is equivalent to the NF (for example, a network functional entity such as the SMF or a UPF) in the network slice. To be specific, whether the network slice in this application is managed by the operator is equivalent to whether the NF (for example, the SMF or the UPF) in the network slice is managed by the operator.

Step 404: The NSSF sends indication information to the AMF.

The indication information may be used to indicate whether the network slice is managed by the operator, or to indicate whether the first identity information of the terminal is hidden, or to indicate whether the domain to which the network slice belongs and the operator security domain belong to the same security domain.

For example, the indication information is used to indicate whether the network slice is managed by the operator. The indication information may be a binary bit number "0" or "1", where "0" indicates that the network slice is not managed by the operator, and "1" indicates that the network slice is managed by the operator. Alternatively, the indication information is a Boolean value "true" or "false", where "false" indicates that the network slice is not managed by the operator, and "true" indicates that the network slice is managed by the operator.

When the method shown in FIG. 4 is applied to the scenario shown in FIG. 2a or FIG. 2b, the NSSF may directly send the indication information to the AMF through a communications interface (for example, a service-based interface Namf) between the NSSF and the AMF.

When the method shown in FIG. 4 is applied to the scenario shown in FIG. 2c, the hNSSF sends indication information to the vNSSF, and the vNSSF sends indication information to the AMF. It should be noted that the indication information sent by the hNSSF to the vNSSF may be the same as or different from the indication information sent by the vNSSF to the AMF. For example, the indication information sent by the hNSSF to the vNSSF may be used to indicate that the network slice is not managed by the operator, while the indication information sent by the vNSSF to the AMF may be used to indicate whether to hide the identity information of the terminal.

It should be noted that in step 404, the NSSF may further send the NSSAI corresponding to the network slice and other information to the AMF. This is not limited in this embodiment of this application.

Step 405: The AMF receives the indication information.

Optionally, after the AMF receives the indication information, the AMF or another network element may further determine whether to hide the first identity information of the terminal based on the indication information. Specifically, for a process of determining whether to hide the first identity information of the terminal based on the indication information, refer to FIG. 7.

In the method shown in FIG. 4, the NSSF may determine whether the network slice is managed by the operator, and send the indication information to the AMF based on a determining result, so that subsequently the AMF or the another network element determines whether to hide the identity information of the terminal based on the indication information. This protects the identity information of the terminal from being leaked.

Different from FIG. 4, in another implementation, an NRF may be used to determine whether a session management network element that serves the terminal is managed by the operator. Specifically, for the method, refer to FIG. 5.

Figure 5:
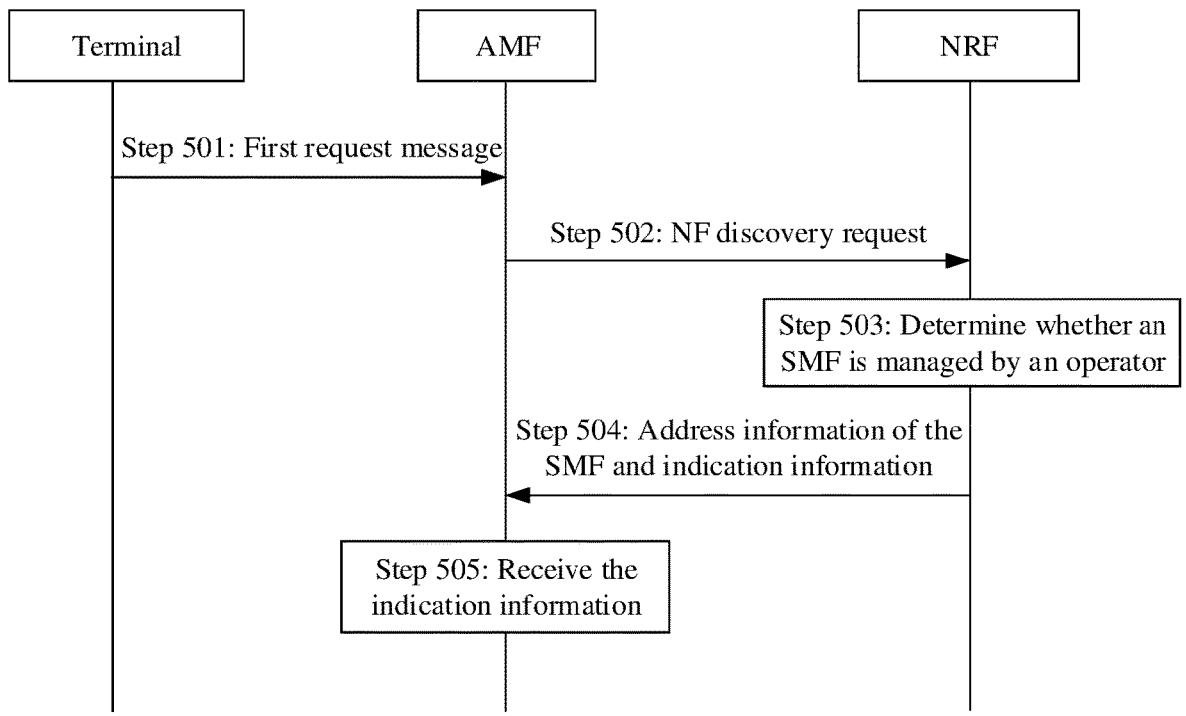
FIG. 5 is a flowchart of another identity information processing method according to an embodiment of this application.

FIG. 5 shows another identity information processing method according to an embodiment of this application. The method may be applied to the scenario shown in FIG. 2a, FIG. 2b, or FIG. 2c. When the method is applied to the scenario shown in FIG. 2a, the AMF and the NRF in the method may be a home AMF (namely, an hAMF) and a home NRF (namely, an hNRF). When the method is applied to the scenario shown in FIG. 2b, the AMF and the NRF in the method may be a visited AMF (namely, a vAMF) and a visited NRF (namely, a vNRF) in FIG. 2b. When the method is applied to the scenario shown in FIG. 2c, the AMF and the NRF in the method may be a visited AMF (namely, a vAMF) and a home NRF (namely, an hNRF) in FIG. 2c. As shown in FIG. 5, the method may include the following steps.

Step 501: A terminal sends a first request message to the AMF.

For a related description of step 501, refer to the description in step 401. Details are not described again.

Step 502: The AMF receives the first request message, and sends an NF discovery request to the NRF.

The NF discovery request may include NSSAI corresponding to a network slice, and the network slice may be a network slice that supports access of the terminal. The NF discovery request may be used to request the NRF to discover an SMF that serves the terminal in a network slice corresponding to the NSSAI, and determine whether the SMF is managed by an operator. In addition to the NSSAI, the NF discovery request may further include one or more pieces of information of a PLMN ID corresponding to the SUPI of the terminal, a TAI of the terminal, a device type of the terminal, a service identifier of the terminal, and a service type parameter of the terminal.

Optionally, in step 502, after the AMF receives the first request message and selects the network slice, if the AMF cannot select the SMF that serves the terminal from the network slice, the AMF sends the NF discovery request to the NRF. If the AMF can select the SMF that serves the terminal from the network slice, the AMF does not send a slice selection request to the NSSF. Specifically, the AMF may determine whether the AMF can select the SMF that serves the terminal by using the prior art. Details are not described in this embodiment of this application. In the scenario shown in FIG. 2c, the network slice selected by the AMF is a visited network slice.

When the method shown in FIG. 5 is applied to the scenario shown in FIG. 2a or FIG. 2c, the AMF may directly send the NF discovery request to the NRF through a communications interface (for example, a service-based interface Nnrf) between the AMF and the NRF. When the method shown in FIG. 4 is applied to the scenario shown in FIG. 2c, as shown in FIG. 2c, the AMF may send an NF discovery request to the vNRF. After receiving the NF discovery request, the vNRF forwards the NF discovery request to the hNRF. The vNRF is an NRF in a visited network slice selected by the AMF, and the hNRF is an NRF in a home network slice corresponding to the visited network slice. It should be noted that both the NF discovery request sent by the AMF to the vNRF and the NF discovery request sent by the vNRF to the hNRF carry NSSAI requested by the terminal. In addition to the NSSAI, information carried in the NF discovery request sent by the AMF to the vNRF may be the same as or different from information carried in the NF discovery request sent by the vNRF to the hNRF.

Step 503: The NRF receives the NF discovery request, and determines whether the SMF is managed by the operator.

The SMF in step 503 may be an SMF that is selected by the NRF from the network slice that supports the access of the terminal and that serves the terminal, or may be another SMF that can serve the terminal. For a process in which the NRF selects the SMF that serves the terminal, refer to the prior art. Details are not described in this embodiment of this application. It should be noted that, in the scenario shown in FIG. 2c, the SMF selected by the NRF is a home SMF (hSMF).

When the SMF is the SMF that is selected by the NRF from the network slice supporting the access by the terminal and that serves the terminal, a process in which the NRF determines whether the SMF is managed by the operator may include The NRF determines whether the network slice corresponding to the NSSAI included in the NF discovery request is managed by the operator, if the network slice is managed by the operator, it is determined that the selected SMF is managed by the operator, otherwise, it is determined that the selected SMF is not managed by the operator. For a process in which the NRF determines whether the network slice corresponding to the NSSAI included in the NF discovery request is managed by the operator, refer to the process in which the NSSF determines whether the network slice is managed by the operator in step 403. Details are not described again.

When the SMF in step 503 is the another SMF, the NRF may determine whether the SMF is managed by the operator based on address information of the SMF. For example, the NRF may view all address information managed by the operator. If the address information of the SMF is included in a range of the address information managed by the operator, it is determined that the SMF is managed by the operator. Otherwise, it is determined that the SMF is not managed by the operator. The address information of the SMF is used to identify the SMF, and may be an Internet Protocol (IP) address of the SMF, or a fully qualified domain name (FQDN) of the SMF, or SMF instance information, or an SMF service instance address, or the like.

It should be noted that the following descriptions relate to a same concept whether the SMF is managed by the operator, whether the network slice in which the SMF is located is managed by the operator, whether the network slice in which the SMF is located is located in an operator security domain, whether identity information sent to the SMF needs to be hidden (or protected), whether identity information of the network slice in which the SMF is located needs to be hidden (or protected), and whether a domain to which the network slice in which the SMF is located belongs and the operator security domain belong to a same security domain. The descriptions may be interchanged. For example, the SMF is the SMF in the network slice that supports the access of the terminal. "Determining whether the SMF is managed by the operator" may be described as "determining whether the network slice accessed by the terminal is managed by the operator", or may be described as "determining whether the network slice accessed by the terminal and an operator security domain belong to a same security domain", and the like. This is not limited. In addition, "whether the SMF is managed by the operator" may be indirectly expressed by using another description language, in other words, a language that can be used to express "whether the SMF is managed by the operator" also falls within the protection scope of this application.

Step 504: The NRF sends the address information of the SMF and indication information to the AMF.

The indication information in step 504 may be used to indicate whether the SMF is managed by the operator, or to indicate whether first identity information of the terminal sent to the SMF is hidden, or to indicate whether a domain to which the SMF belongs and the operator security domain belong to the same security domain. For a specific representation form of the indication information, refer to the description in step 404. Details are not described again.

When the method shown in FIG. 5 is applied to the scenario shown in FIG. 2a or FIG. 2b, the NRF may directly send the address information of the SMF and the indication information to the AMF through a communications interface (for example, a service-based interface Namf) between the NRF and the AMF.

When the method shown in FIG. 5 is applied to the scenario shown in FIG. 2c, the hNRF sends the address information of the SMF and indication information to the vNRF, and the vNRF sends the address information of the SMF and indication information to the AMF. It should be noted that the indication information sent by the hNRF to the vNRF may be the same as or different from the indication information sent by the vNRF to the AMF. For example, the indication information sent by the hNRF to the vNRF may be used to indicate that the SMF is not managed by the operator, while the indication information sent by the vNRF to the AMF may be used to indicate to hide the first identity information of the terminal sent to the SMF.

Step 505: The AMF receives the address information and the indication information of the SMF.

Further optionally, after the AMF receives the indication information, the AMF or another network element may determine whether to hide the first identity information of the terminal based on the indication information. Specifically, for a process of determining whether to hide the first identity information of the terminal based on the indication information, refer to FIG. 7. It should be noted that, in the method shown in FIG. 5, the NRF may alternatively send only the address information of the SMF to the AMF. Subsequently, after receiving the address information of the SMF, the AMF determines whether the SMF is managed by the operator based on the address information of the SMF. For example, if the address information of the SMF is included in the range of the address information managed by the operator, it is determined that the SMF is managed by the operator. Otherwise, it is determined that the SMF is not managed by the operator.

In the method shown in FIG. 5, the NRF may determine whether the SMF in the network slice is managed by the operator, and send the indication information to the AMF based on a determining result, so that subsequently, the AMF or the another network element determines whether to hide the identity information of the terminal based on the indication information. This protects the identity information of the terminal from being leaked.

Different from the method shown in FIG. 4 or FIG. 5, in another implementation, the AMF may be used to determine whether the network slice is managed by the operator. Specifically, for the implementation, refer to FIG. 6.

Figure 6:
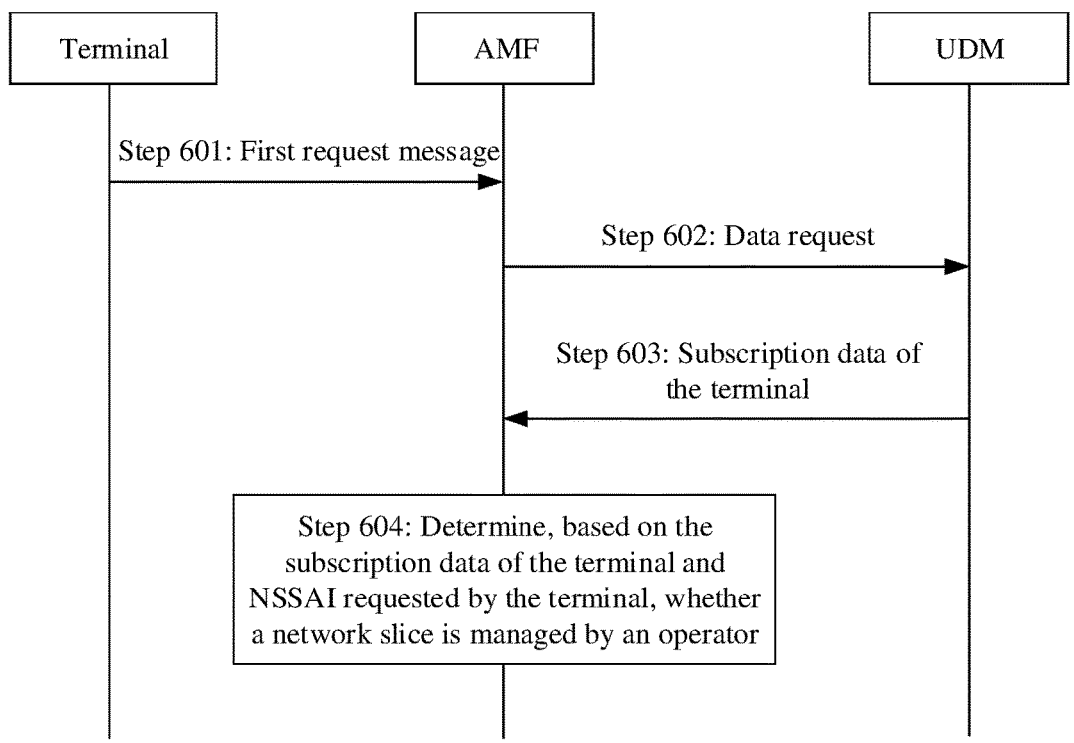
FIG. 6 is a flowchart of still another identity information processing method according to an embodiment of this application.

FIG. 6 shows still another identity information processing method according to an embodiment of this application. The method may be applied to the scenario shown in FIG. 2a, FIG. 2b, or FIG. 2c. When the method is applied to the scenario shown in FIG. 2a, the AMF and the UDM in the method may be a home AMF (namely, hAMF) and a home UDM. When the method is applied to the scenario shown in FIG. 2b, the AMF in the method may be a visited AMF (namely, a vAMF) in FIG. 2b, and the UDM may be a home UDM. When the method is applied to the scenario shown in FIG. 2c, the AMF in the method may be a visited AMF (namely, a vAMF) in FIG. 2c, and the UDM may be a home UDM. As shown in FIG. 6, the method may include the following steps.

Step 601: A terminal sends a first request message to the AMF.

For a related description of step 601, refer to the description in step 401. Details are not described again.

Step 602: The AMF receives the first request message, and sends a data request to the UDM.

The data request may include first identity information of the terminal, and the data request may be used to request subscription data of the terminal. The data request may be an Nudm message.

Step 603: The UDM obtains the subscription data of the terminal, and sends the obtained subscription data of the terminal to the AMF.

The subscription data of the terminal may include NSSAI subscribed by the terminal, or a data network name (DNN) subscribed by the terminal, or a correspondence between the NSSAI subscribed by the terminal and whether the NSSAI subscribed by the terminal is managed by an operator, or a correspondence between the DNN subscribed to by the terminal and whether the DNN subscribed by the terminal is managed by the operator.

Step 604: The AMF receives the subscription data of the terminal, and determines, based on the subscription data of the terminal and the NSSAI requested by the terminal, whether a network slice is managed by the operator.

The network slice may be a network slice that supports access of the terminal. The AMF may determine, based on the subscription data of the terminal and the NSSAI requested by the terminal, the network slice that supports the access of the terminal. For a specific implementation, refer to the prior art. Details are not described again.

Specifically, for a process in which the AMF determines whether the network slice is managed by the operator, refer to the process in which the NSSF determines whether the network slice is managed by the operator in step 403. Details are not described again. In addition to step 403, the AMF may further determine, based on a DNN corresponding to the network slice and based on whether the DNN is managed by the operator, whether the network slice is managed by the operator. For example, if the DNN is managed by the operator, it is determined that the network slice is managed by the operator. Otherwise, it is determined that the network slice is not managed by the operator.

Optionally, after the AMF further determines whether the network slice is managed by the operator, the AMF or another network element may determine whether to hide the first identity information of the terminal. Specifically, for a process of determining whether to hide the first identity information of the terminal, refer to FIG. 7.

In the method shown in FIG. 6, the AMF may determine whether the network slice is managed by the operator, so that subsequently the AMF or the another network element determines whether to hide the identity information of the terminal based on a determining result of the AMF. This protects the identity information of the terminal from being leaked.

The foregoing FIG. 4 to FIG. 6 mainly describe whether the network slice or the SMF is managed by the operator. Next, when the network slice or the SMF is managed by the operator, the first identity information of the terminal is hidden. On the contrary, the first identity information of the terminal is directly sent to the SMF in the network slice. Specifically, for the process, refer to FIG. 7.

Figure 7:
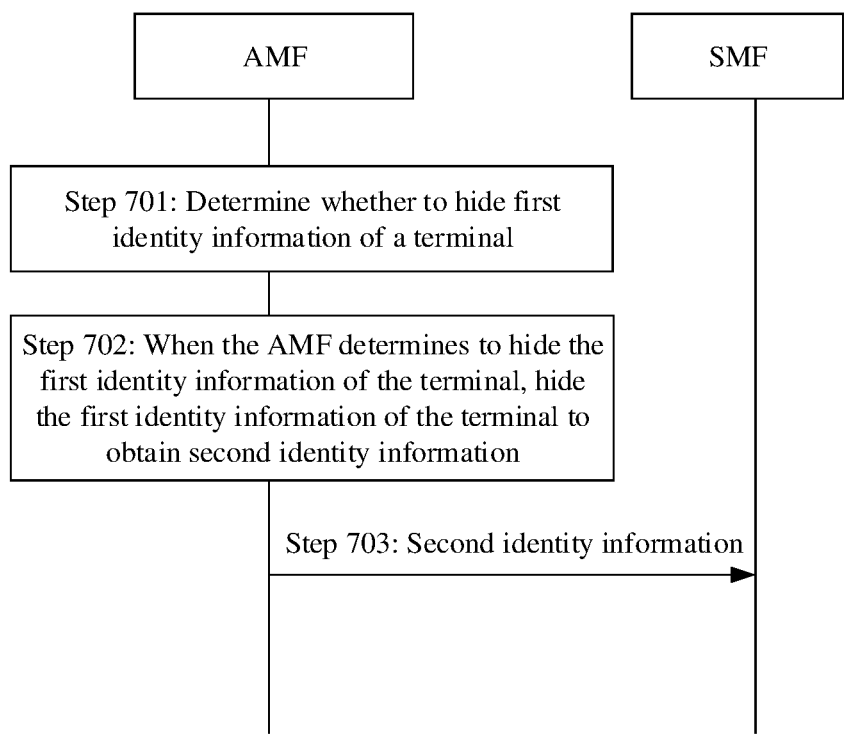
FIG. 7 is a flowchart of still another identity information processing method according to an embodiment of this application.

FIG. 7 is a schematic flowchart of an identity information processing method according to this application. The method may be applied to the scenario shown in FIG. 2a, FIG. 2b, or FIG. 2c. When the method is applied to the scenario shown in FIG. 2a, the AMF and The SMF may be a home AMF (namely, an hAMF) or a home SMF. When the method is applied to the scenario shown in FIG. 2b, the AMF in the method may be a visited AMF (namely, a vAMF) in FIG. 2b, and the SMF may be a visited SMF (vSMF). When the method is applied to the scenario shown in FIG. 2c, the AMF in the method may be a visited AMF (namely, a vAMF) in FIG. 2c, and the SMF may be a home SMF (hSMF). As shown in FIG. 7, the method includes the following steps.

Step 701: The AMF determines whether to hide first identity information of a terminal.

In a possible design, the AMF determines, based on indication information received from an NSSF or an NRF, whether to hide the first identity information of the terminal. For related descriptions of the indication information, refer to the descriptions in FIG. 4 or FIG. 5. Details are not described again.

For example, if the indication information is used to indicate that a network slice is managed by an operator, it is determined not to hide the first identity information of the terminal. Otherwise, it is determined to hide the first identity information of the terminal. Alternatively, if the indication information is used to indicate to hide the first identity information of the terminal, it is directly determined to hide the first identity information of the terminal. Otherwise, it is determined not to hide the first identity information of the terminal.

In another possible design, the AMF determines whether to hide the first identity information of the terminal according to a local preset policy. For example, the AMF may determine whether to hide the first identity information of the terminal by using the method shown in FIG. 6.

It should be noted that an implementation in which the AMF determines whether to hide the first identity information of the terminal is not limited in this application.

Step 702: When the AMF determines to hide the first identity information of the terminal, the AMF hides the first identity information of the terminal to obtain second identity information.

In the embodiments of this application, hiding may be encryption, encapsulation, or protection. The second identity information may be hidden identity information of the terminal, and the second identity information may correspond to the first identity information of the terminal.

Specifically, the AMF may hide the first identity information of the terminal in the following manners to obtain the second identity information.

Manner 1: The first identity information of the terminal is encrypted by using a public key to obtain the second identity information.

Manner 2: The first identity information of the terminal is encrypted by using a shared key to obtain the second identity information. The shared key is preconfigured on a network element (such as the AMF) that hides the first identity information of the terminal and a network element that decrypts the second identity information.

Manner 3: The AMF derives a new key based on a shared key, and encrypts the first identity information of the terminal by using the new key to obtain the second identity information.

For example, a new key is K_SST=KDF(K), or K_SST=KDF(K, SST), where K is a shared key, SST is slice information included in NSSAI, and KDF is a key derivation function. The shared key K is preconfigured on a network element (such as the AMF) that hides the first identity information of the terminal and a network element (such as the decryption functional entity shown in FIG. 8) that decrypts the second identity information.

It should be noted that, in addition to K and SST, parameters in the key derivation function may further include at least one of a slice ID and a session ID, or may include time, a calculator, a sequence number, a random number (nonce), and the like. In Manner 3, the AMF needs to send the parameters (for example, the slice ID, the time, the calculator, the sequence number, and the nonce) that are not shared between the AMF and the network element that decrypts the second identity information to the SMF, so that the SMF sends these parameters that are not shared to the network element that decrypts the second identity information. In this way, the network element that decrypts the second identity information obtains K_SST by using a same derivation function and derivation parameter, and further decrypts the second identity information based on K_SST to obtain the first identity information of the terminal.

Manner 4: The AMF randomizes the first identity information of the terminal to obtain the second identity information.

In a possible design, the AMF randomizes the first identity information of the terminal based on a hash-type function. The hash-type function herein may be a common hash-type function (such as SHA-256), or a media access control (Media Access Control, MAC) message authentication code (Message Authentication Code) function (for example, a hashed-base message authentication code (HMAC) or a cipher-based MAC (CMAC)). This is not limited in this embodiment of this application. For example, the first identity information of the terminal is an SUPI, and the hidden identity information=hash (SUPI, SST), or hash (SUPI, SST, (at least one of the nonce, the sequence number (sequence number), and the time (time))). The nonce is any value generated by the AMF. The sequence number is a sequence number of information exchanged between the AMF and the SMF at a moment before a current moment. The time is time of a timer in the AMF at the current moment.

In another possible design, the second identity information includes routing information (routing information) of the AMF and a nonce generated by the AMF. For example, the first identity information of the terminal is an SUPI, and Hide (SUPI)=AMF routing information||random number.

In Manner 4, the AMF stores a correspondence between the hidden second identity information and the first identity information of the terminal, so that subsequently, after receiving a decryption request sent by a network element that decrypts the second identity information, the AMF decrypts the decryption request based on the correspondence to obtain the first identity information of the terminal.

Manner 5: The AMF uses a GPSI corresponding to the first identity information of the terminal as the hidden second identity information.

It should be noted that, in this application, hiding the first identity information of the terminal may mean entirely or partially hiding the first identity information of the terminal, where partially hiding means hiding part of information in the first identity information of the terminal. For example, the first identity information of the terminal is an SUPI. The SUPI includes two parts of information: a network identifier and an identity. The network identifier may be an MNC or an MCC, and the identity may be an MSIN. The network identifier may not need to be hidden, and the identity is hidden.

Step 703: The AMF sends the second identity information to the SMF.

The second identity information may be sent to the SMF in a session establishment request or a session update request. In addition to the second identity information, the AMF may further send an indication used to indicate that the second identity information is the hidden identity information to the SMF, so that after receiving the indication, the SMF sends the second identity information and the indication to a PCF, a CHF, a UDM, or the like.

When the method shown in FIG. 7 is applied to the scenario shown in FIG. 2a or FIG. 2b, the AMF may directly send the second identity information to the SMF through a communications interface (for example, a service-based interface Nsmf) between the AMF and the SMF. Alternatively, the AMF sends the second identity information to a first SEEP in a domain in which the AMF is located, and after receiving the second identity information, the first SEEP sends the second identity information to a second SEEP in a domain in which the SMF is located, then the second SEEP receives the second identity information, and sends the received second identity information to the SMF.

When the method shown in FIG. 7 is applied to the scenario shown in FIG. 2c, the hAMF sends the second identity information to the vSMF, and the vSMF sends the second identity information to the hSMF.

Optionally, when the AMF determines not to hide the first identity information of the terminal, the AMF directly sends the first identity information of the terminal to the SMF. In addition to the first identity information of the terminal, the AMF may further send an indication used to indicate that the first identity information is unhidden identity information to the SMF. For a process in which the AMF sends the first identity information to the SMF, refer to the process in which the AMF sends the second identity information to the SMF. Details are not described again.

In this application, "0" or "1" may be used to indicate whether the identity information sent by the AMF to the SMF is the hidden identity information. For example, "0" indicates that the identity information sent by the AMF to the SMF is not hidden, and "1" indicates that the identity information sent by the AMF to the SMF is hidden. It should be noted that, when sending the first identity information of the terminal to the SMF, the AMF may not send the indication used to indicate that the first identity information is the unhidden identity information to the SMF. When the SMF receives a message including only the first identity information of the terminal, the received identity information is the unhidden identity information by default.

Optionally, in the method shown in FIG. 7, the AMF determines whether to perform step 701 shown in FIG. 7 and a process of hiding the first identity information of the terminal according to the local policy. The local policy is preconfigured on the AMF, and the local policy is used to specify that before the AMF sends identity information of the terminal to another network element, an AMF function of determining whether to hide the identity information of the terminal is enabled or disabled. When the AMF determines not to perform step 701, the AMF may hide the identity information of the terminal by using the another network element. The details are as follows.

In FIG. 2a or FIG. 2b, after the AMF receives the indication information sent by the NSSF or the NRF, or the AMF determines whether the network slice is managed by the operator, steps 702 to 703 are not performed. Instead, the AMF sends the indication information for hiding the first identity information of the terminal and the first identity information of the terminal to the first SEEP in which the AMF is located or the second SEEP in which the SMF is located, so that the first SEEP or the second SEEP hides the first identity information of the terminal based on the indication information for hiding the first identity information of the terminal, obtains the second identity information, and sends the second identity information to the SMF. For a process in which the first SEEP or the second SEEP hides the first identity information of the terminal, refer to the process in which the AMF hides the first identity information of the terminal. Details are not described again.

In FIG. 2c, after the AMF receives the indication information sent by the NSSF or the NRF, or the AMF determines whether the network slice is managed by the operator, the AMF does not perform steps 702 to 703. Instead, the AMF sends indication information used to indicate to hide the first identity information of the terminal and the first identity information of the terminal to the vSMF, so that the vSMF hides the first identity information of the terminal based on the indication information for hiding the first identity information of the terminal, obtains the second identity information, and sends the second identity information to the hSMF. For a process in which the vSMF hides the first identity information of the terminal, refer to the process in which the AMF hides the first identity information of the terminal. Details are not described again. The indication information received by the AMF may be the same as or different from the indication information sent by the AMF to the vSMF. For example, the indication information received by the AMF may be that the network slice is not managed by the operator, and the indication information sent by the AMF to the vSMF may be to hide the first identity information of the terminal.

In the method shown in FIG. 7, identity information that needs to be hidden may be hidden and then sent to the SMF, to protect the identity information of the terminal from being leaked when being sent to a vertical industry security domain.

Figure 8:
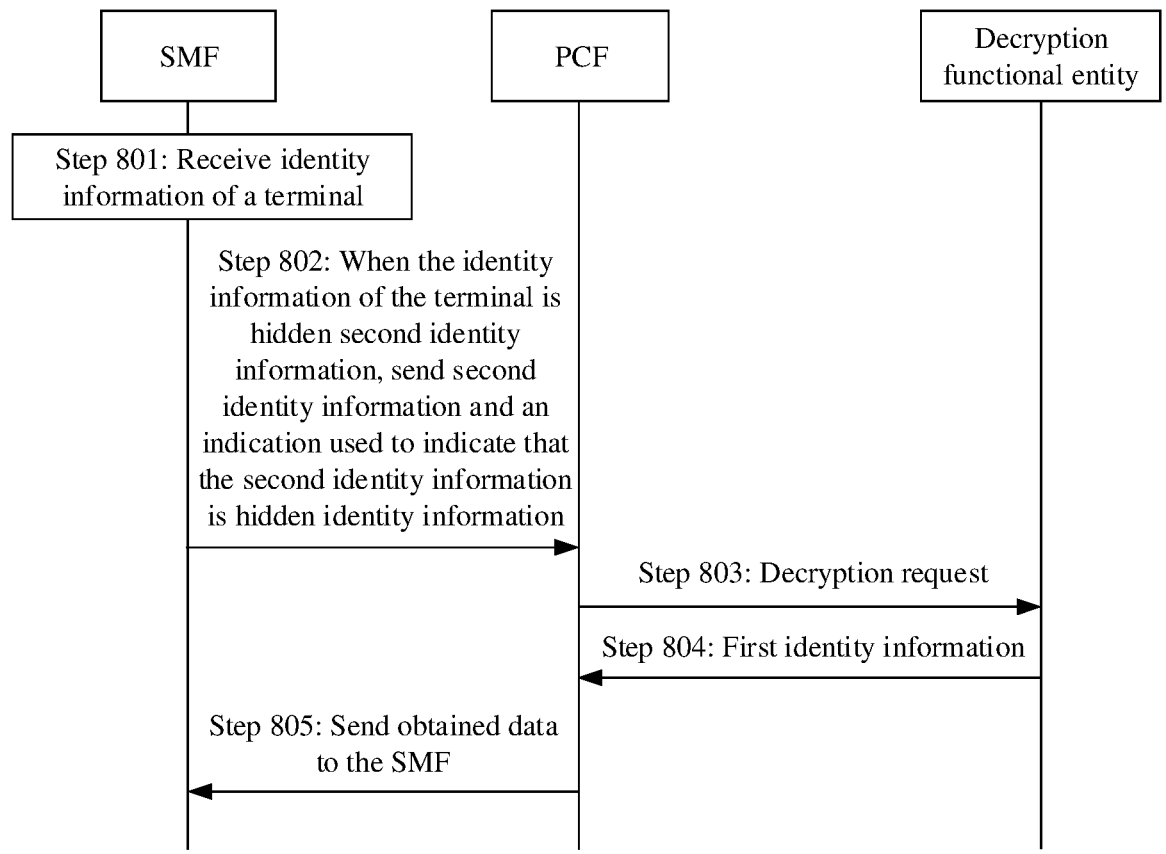
FIG. 8 is a flowchart of still another identity information processing method according to an embodiment of this application.

After receiving the identity information (the first identity information or the second identity information) of the terminal, the SMF may send the received identity information to the PCF, the CHF, or the UDM, so that the PCF, the CHF, or the UDM receives the identity information of the terminal sent by the SMF, and when the identity information of the terminal is the hidden second identity information, requests the decryption functional entity to decrypt the second identity information to obtain a first identity, obtains terminal-related data based on decrypted first identity information, and returns the terminal-related data to the SMF. With reference to FIG. 8, the following describes a process by using an example in which the SMF sends the identity information of the terminal received by the SMF to the PCF. For a process in which the SMF sends the identity information of the terminal to the UDM or the CHF, refer to the process shown in FIG. 8.

FIG. 8 is a flowchart of an identity information processing method according to this application. The method may be applied to the scenario shown in FIG. 2*a*, FIG. 2*b*, or FIG. 2*c*. When the method is applied to the scenario shown in FIG. 2*a*, the SMF in the method may be a home SMF, and the PCF may be a home PCF. When the method is applied in the scenario shown in FIG. 2*b*, the SMF in the method may be a visited SMF (vSMF), and the PCF may be a home PCF. When the method is applied in the scenario shown in FIG. 2*c*, the SMF in the method may be a home SMF (hSMF), and the PCF may be a home PCF. As shown in FIG. 8, the method includes the following steps.

Step 801: The SMF receives identity information of a terminal.

The identity information received by the SMF may be unhidden first identity information of the terminal or hidden second identity information.

Optionally, in step 801, the SMF further receives an indication used to indicate whether the identity information of the terminal is hidden identity information, so that the SMF can determine whether the received identity information is the hidden identity information based on the indication. Alternatively, in step 801, the SMF receives second identity information and an indication used to indicate that the identity information of the terminal is hidden identity information, so that the SMF can determine that the received identity information is the hidden identity information based on the indication.

Step 802: When the identity information of the terminal is the hidden second identity information, the SMF sends the second identity information and an indication used to indicate that the second identity information is the hidden identity information to the PCF.

Optionally, the SMF sends the second identity information and the indication used to indicate that the second identity information is the hidden identity information to the PCF through an SEEP, or sends the second identity information and the indication used to indicate that the second identity information is the hidden identity information to the PCF through a communications interface (for example, a service-based interface Npcf) between the SMF and the PCF.

Optionally, the indication used to indicate that the second identity information is the hidden identity information may not be sent. The PCF may determine whether the identity information is the hidden identity information based on the received identity information. Alternatively, the PCF may determine whether the identity information sent by the SMF is the hidden identity information based on information (for example, an address of a source SMF) of the SMF. In other words, the PCF may determine whether the identity information received by the PCF is the hidden identity information without an indication.

Step 803: The PCF receives the second identity information and the indication used to indicate that the second identity information is the hidden identity information, and sends a decryption request to a decryption functional entity.

The decryption request includes the second identity information, and the decryption request may be used to request to decrypt the hidden second identity information.

The decryption functional entity may be any network element of a UDM, an AMF, a CHF, an AUSF, an ARPF, an NRF and the PCF. It should be noted that, when the decryption functional entity is another function other than the decryption functional entity, one optional manner is that the PCF obtains address information of the decryption functional entity, and sends the decryption request to the decryption functional entity based on the address information of the decryption functional entity.

The address information of the decryption functional entity may be sent by the decryption functional entity to the SMF, and sent by the SMF to the PCF. For example, the decryption functional entity is the AMF. The address information of the decryption functional entity and the second identity information may be included in a same message and sent to the PCF, or may be included in a different message and sent to the PCF. Alternatively, the address information of the decryption functional entity is preconfigured on the PCF. When the PCF receives the second identity information and the indication used to indicate that the second identity information is the hidden identity information, the PCF sends the decryption request to the decryption functional entity based on the preconfigured address information of the decryption functional entity in the PCF. Alternatively, when the decryption functional entity is the AMF, and the AMF hides the identity information of the terminal in Manner 4, the PCF may determine the AMF based on AMF routing information in the hidden identity information, and request the AMF to decrypt the hidden identity information. For example, Hide (SUPI)=AMF routing information∥random number. After receiving Hide (SUPI), the PCF determines address information of the AMF based on the AMF routing information and sends a decryption request to the AMF.

Step 804: The decryption functional entity receives the decryption request, decrypts the hidden second identity information, obtains the first identity information of the terminal, and sends the first identity information of the terminal to the PCF.

When the identity information of the terminal is hidden in Manner 1, the decryption functional entity decrypts the hidden second identity information by using a private key, and obtains the first identity information of the terminal.

When the identity information of the terminal is hidden in Manner 2, the decryption functional entity decrypts the hidden second identity information by using a shared key, and obtains the first identity information of the terminal. The shared key is pre-stored in the decryption functional entity.

When the identity information of the terminal is hidden in Manner 3, after obtaining the shared key by using a derivation function and a derivation parameter, the decryption functional entity decrypts the hidden first identity information based on the shared key, and obtains the second identity information of the terminal.

When the identity information of the terminal is hidden in Manner 4, the decryption functional entity is the AMF, the AMF stores a correspondence between the hidden second identity information and the first identity information of the terminal, and obtains the first identity information of the terminal based on the correspondence.

When the identity information of the terminal is hidden in Manner 5, the decryption functional entity is the AMF or the UDM, and the decryption functional entity decrypts the hidden second identity information by using a correspondence between the identity information of the terminal and a GPSI, and obtains the first identity information of the terminal.

Step 805: The PCF receives the first identity information of the terminal, obtains data corresponding to the first identity information, and sends the obtained data to the SMF.

It should be noted that when the identity information of the terminal is the first identity information, the SMF sends the first identity information to the PCF. The PCF receives the first identity information sent by the SMF, directly obtains the data corresponding to the first identity information without decrypting the received first identity information, and sends the obtained data to the SMF.

In the method shown in FIG. 8, when the identity information received by the PCF is the hidden identity information, the PCF requests the decryption functional entity to decrypt the hidden identity information, obtains data corresponding to the decrypted identity information, and sends the obtained data to the SMF. In this way, the SMF implements service transmission in a PDU session based on the received data. This avoids leakage of identity information of the terminal while ensuring service transmission continuity.

Further, in the method shown in FIG. 8, the PCF may send information corresponding to the hidden second identity information to the SMF, so that the SMF stores the hidden second identity information and the information corresponding to the second identity information. Subsequently, when the PCF needs to send a message (for example, a notification message) to the SMF, the PCF sends the hidden second identity information to the SMF, so that the SMF directly obtains the information corresponding to the second identity information based on the hidden second identity information, and performs a corresponding operation based on the obtained information. For example, a policy corresponding to a user is updated, or a UPF is notified, or a quality of service (Quality of Server, QoS) change is sent to an access network device. In this way, when notifying the SMF to send the information, the PCF may directly send the hidden identity information to the SMF, and does not need to decrypt the hidden identity information by using the decryption functional entity and then send the information to the SMF. This reduces processing power consumption of a third network element and signaling overheads between the third network element and another network element.

The foregoing mainly describes the solutions provided in the embodiments of this application from a perspective of interaction between the AMF, the SMF, the NSSF, and the NRF. It may be understood that, to implement the foregoing functions, the AMF includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of this application.

In the embodiments of this application, the communications apparatus that performs the foregoing method may be divided into functional modules according to the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 9:
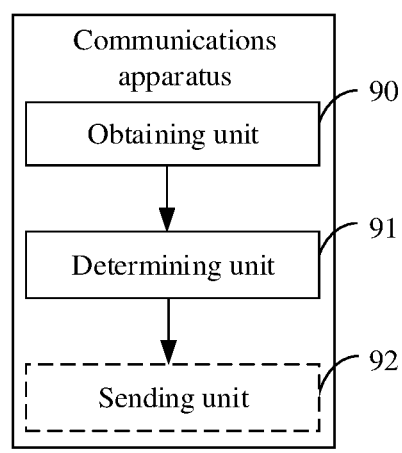
FIG. 9 is a schematic composition diagram of a communications apparatus according to an embodiment of this application.

FIG. 9 is a structural diagram of a communications apparatus. The communications apparatus may be a slice selection network element (for example, an NSSF), or a chip or a system-on-a-chip in the slice selection network element. The communications apparatus may alternatively be a network repository network element (for example, an NRF), or a chip or a system-on-a-chip in the network repository network element. The communications apparatus may alternatively be an access and mobility management network element (for example, an AMF), or a chip or a system-on-a-chip in the access and mobility management network element. The communications apparatus may be configured to perform a function of the terminal in the foregoing embodiments. In an implementation, the communications apparatus shown in FIG. 9 includes an obtaining unit 90 and a determining unit 91.

The obtaining unit 90 is configured to obtain a first parameter used to determine a domain to which a network slice belongs. For example, the obtaining unit 90 supports the communications apparatus shown in FIG. 9 to perform step 402, step 502, or step 601.

The determining unit 91 is configured to determine, based on the first parameter, whether the network slice is managed by an operator. For example, the determining unit 91 is configured to support the communications apparatus shown in FIG. 9 to perform step 403, step 503, or step 604.

Further, as shown in FIG. 9, when the communications apparatus is the slice selection network element (for example, the NSSF), or the chip or the system-on-a-chip in the slice selection network element, or when the communications apparatus is the network repository network element (for example, the NRF), or the chip or the system-on-a-chip in the network repository network element, the communications apparatus may further include a sending unit 92.

The sending unit 92 is configured to send indication information to the access and mobility management network element. Related descriptions of the indication information is described above, and details are not described again. For example, the sending unit 92 is configured to support the communications apparatus shown in FIG. 9 to perform step 404 and step 504.

It should be noted that all related content of the steps in the foregoing method embodiments may be referenced to function descriptions of corresponding functional modules. Details are not described herein again. The communications apparatus provided in this embodiment of this application is configured to perform a function of the communications apparatus in the foregoing identity information processing method, and therefore can achieve a same effect as the foregoing identity information processing method.

In another implementation, the communications apparatus shown in FIG. 9 may include a processing module and a communications module. The obtaining unit 90 and the determining unit 91 are integrated into the processing module, and the sending unit 92 is integrated into the communications module. The processing module is configured to control and manage an action of the communications apparatus. For example, the processing module is configured to support the communications apparatus to perform step 403, step 503, or step 604 and performing another process of the technology described in this specification. The communications module is configured to support the communications apparatus to perform step 404 and step 504 and in communicating with another network entity, for example, communicating with the functional module or the network entity shown in FIG. 1. Further, the communications apparatus may include a storage module, configured to store program code and data of the communications apparatus.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus shown in FIG. 9 may be the communications apparatus shown in FIG. 3.

Figure 10:
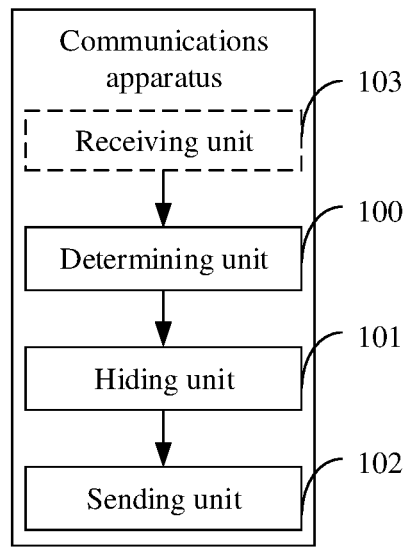
FIG. 10 is a schematic composition diagram of another communications apparatus according to an embodiment of this application.

FIG. 10 is a structural diagram of a communications apparatus. The communications apparatus may be a network edge protection agent (for example, an SEEP), or a chip or a system-on-a-chip in the security edge protection proxy. The communications apparatus may alternatively be a visited session management network element (for example, a vSMF), or a chip or a system-on-a-chip in the visited session management network element. The communications apparatus may alternatively be an access and mobility management network element (for example, an AMF), or a chip or a system-on-a-chip in the access and mobility management network element. The communications apparatus may be configured to perform a function of the terminal in the foregoing embodiments. In an implementation, the communications apparatus shown in FIG. 10 includes a determining unit 100, a hiding unit 101, and a sending unit 102.

The determining unit 100 is configured to determine whether to hide first identity information of a terminal. For example, the determining unit 100 is configured to support the communications apparatus shown in FIG. 10 to perform step 701.

The hiding unit 101 is configured to when the first identity information of the terminal is determined to be hidden, hide the first identity information to obtain second identity information. For example, the hiding unit 101 is configured to support the communications apparatus shown in FIG. 10 to perform step 702.

The sending unit 102 is configured to send the second identity information to the session management network element. For example, the sending unit 102 is configured to support the communications apparatus shown in FIG. 10 to perform step 703.

Further, as shown in FIG. 10, the communications apparatus may include a receiving unit 103.

The receiving unit 103 is configured to receive indication information sent by a slice selection network element or a network repository network element. Related descriptions of the indication information is described above, and details are not described again.

The determining unit 100 is specifically configured to determine, based on the indication information, whether to hide the first identity information of the terminal.

It should be noted that all related content of the steps in the foregoing method embodiments may be referenced to function descriptions of corresponding functional modules. Details are not described herein again. The communications apparatus provided in this embodiment of this application is configured to perform a function of the communications apparatus in the foregoing identity information processing method, and therefore can achieve a same effect as the foregoing identity information processing method.

In another implementation, the communications apparatus shown in FIG. 10 may include a processing module and a communications module. The processing module is integrated with the determining unit 100 and the hiding unit 101. The communications module is integrated with the receiving unit 103 and the sending unit 102. The processing module is configured to control and manage an action of the communications apparatus. For example, the processing module is configured to support the communications apparatus to perform step 701 and step 702 and performing another process of the technology described in this specification. The communications module is configured to support the communications apparatus to perform step 703 and in communicating with another network entity, for example, communicating with the functional module or the network entity shown in FIG. 1. Further, the communications apparatus may include a storage module, configured to store program code and data of the communications apparatus.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus shown in FIG. 10 may be the communications apparatus shown in FIG. 3.

Figure 11:
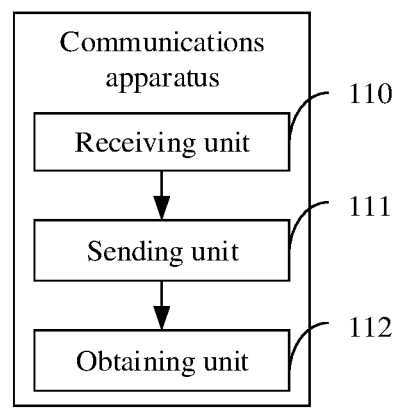
FIG. 11 is a schematic composition diagram of still another communications apparatus according to an embodiment of this application.

FIG. 11 is a structural diagram of a communications apparatus. The communications apparatus may be a policy control network element (for example, a PCF), or a chip or a system-on-a-chip in the policy control network element. The communications apparatus may alternatively be a charging network element (for example, a CHF), or a chip or a system-on-a-chip in the charging network element. The communications apparatus may alternatively be a data management network element (such as a UDM), or a chip or a system-on-a-chip in the data management network element. The communications apparatus may be configured to perform a function of the terminal in the foregoing embodiments. In an implementation, the communications apparatus shown in FIG. 11 includes a receiving unit 110, a sending unit 111, and an obtaining unit 112.

The receiving unit 110 is configured to receive identity information of a terminal and an indication used to indicate that the identity information of the terminal is hidden identity information that are sent by a session management network element. For example, the receiving unit 110 is configured to support the communications apparatus shown in FIG. 11 to perform step 802.

The sending unit 111 is configured to send a decryption request to a decryption functional entity based on the indication, where the decryption request includes the identity information of the terminal, and the decryption request is used to request to decrypt the identity information of the terminal. For example, the sending unit 111 is configured to support the communications apparatus shown in FIG. 11 to perform step 803.

The receiving unit 110 is further configured to receive the decrypted identity information from the decryption functional entity. For example, the receiving unit 110 is configured to support the communications apparatus shown in FIG. 11 to perform step 804.

The obtaining unit 112 is configured to obtain data corresponding to the decrypted identity information.

The sending unit 11 is further configured to send the data to the session management network element. For example, the sending unit 11 is configured to support the communications apparatus shown in FIG. 11 to perform step 805.

It should be noted that all related content of the steps in the foregoing method embodiments may be referenced to function descriptions of corresponding functional modules. Details are not described herein again. The communications apparatus provided in this embodiment of this application is configured to perform a function of the communications apparatus in the foregoing identity information processing method, and therefore can achieve a same effect as the foregoing identity information processing method.

In another implementation, the communications apparatus shown in FIG. 11 may include a processing module and a communications module. The processing module is integrated with the obtaining unit 112. The communications module is integrated with the receiving unit 110 and the sending unit 111. The processing module is configured to control and manage an action of the communications apparatus. For example, the processing module is configured to support the communications apparatus to obtain the data corresponding to the decrypted identity information and to perform another process of the technology described in this specification. The communications module is configured to support the communications apparatus to perform step 802, step 803, step 804, step 805, and to communicate with another network entity, for example, communicating with the functional module or the network entity shown in FIG. 1. Further, the communications apparatus may include a storage module, configured to store program code and data of the communications apparatus.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus shown in FIG. 1 may be the communications apparatus shown in FIG. 3.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clearly that various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An identity information processing method, comprising:
   obtaining, by a first network element, a first parameter, wherein the first parameter is associated with a domain to which a network slice belongs;
   determining, by the first network element, according to the first parameter, whether the network slice is managed by an operator; and
   sending, by the first network element to a second network element in the network slice, indication information associated with whether the operator manages the network slice and indicating whether first identity information of a terminal should be hidden, wherein the indication information indicating that the network slice is not operated by the operator causes the second network element to determine to hide the first identity information by obtaining second identity information for transmission to a session management network element.

2. The identity information processing method according to claim 1, wherein the first network element is at least one of a slice selection network element, a network repository network element, or an access and mobility management network element.

3. The identity information processing method according to claim 2, wherein the first network element is at least one of the slice selection network element or the network repository network element; and
   wherein the sending the indication information comprises:
      sending, by the first network element, indication information to an access and mobility management network element.

4. The identity information processing method according to claim 1, wherein the first parameter comprises at least one of network slice selection assistance information (NSSAI) corresponding to the network slice, a routing area identifier (TAI) of a terminal, or a service type of the terminal.

5. An identity information processing method, comprising:
   receiving, by a second network element in a first network slice, indication information associated with whether an operator manages a second network slice and indicating whether first identity information of a terminal should be hidden;
   determining, by the second network element, according to the indication information indicating whether the operator manages the second network slice, whether to hide the first identity information of the terminal, wherein the indication information indicating that the second network slice is not operated by the operator causes the second network element to determine to hide the first identity information;
   hiding, by the second network element, in response to the second network element determining to hide the first identity information of the terminal, the first identity information to obtain second identity information; and
   sending the second identity information to a session management network element in the second network slice.

6. The identity information processing method according to claim 5, wherein the second network element at least one of an access and mobility management network element, a security edge protection proxy, or a visited session management network element.

7. The identity information processing method according to claim 5, wherein
   the indication information indicates whether first identity information of a terminal should be hidden by indicating at least one of whether a network slice is managed by the operator, whether to hide the first identity information of the terminal, or whether a domain to which a network slice belongs and an operator security domain belong to a same security domain.

8. The identity information processing method according to claim 5, wherein the hiding the first identity information to obtain second identity information comprises performing at least one of:
   encrypting, by the second network element, the first identity information of the terminal by using a public key, to obtain the second identity information; or
   encrypting, by the second network element, the first identity information of the terminal by using a shared key, to obtain the second identity information; or
   obtaining, by the second network element, a new key based on a shared key and a key derivation function, and encrypting the first identity information of the terminal by using the new key, to obtain the second identity information; or
   randomizing, by the second network element, the first identity information of the terminal, to obtain the second identity information; or
   using, by the second network element, a generalized public user identity (GPSI) corresponding to the first identity information of the terminal as the second identity information.

9. An identity information processing method, comprising:
   receiving, by a first network element in a second network slice belonging to a second domain, from a session management network element in a first network slice belonging to a first domain different from the second domain, identity information of a terminal and an indication indicating that the identity information of the terminal is hidden identity information, wherein the indication indicating that the identity information of the terminal is hidden identity information is associated with the second network slice not being managed by an operator;
   sending, by the first network element, according to the indication, a decryption request to a decryption functional entity, wherein the decryption request comprises the identity information of the terminal, and wherein the decryption request requests decryption of the identity information of the terminal;
   receiving, by the first network element, from the decryption functional entity, decrypted identity information;
   obtaining, by the first network element, data corresponding to the decrypted identity information; and
   sending, by the first network element, the data to the session management network element.

10. The identity information processing method according to claim 9, wherein the first network element is at least one of a policy control network element, a charging network element, or a data management network element.

11. The identity information processing method according to claim 9, wherein the decryption functional entity is at least one of an access and mobility management network element, a data management network element, a network repository network element, a charging network element, a policy control network element, or an authentication network element.

12. A communications apparatus, comprising:
a processor; and
a non-transitory computer-readable storage medium storing a program to be executed by the processor, the program including instructions to:
  obtain a first parameter, wherein the first parameter is associated with a domain to which a network slice belongs;
  determine, according to the first parameter, whether the network slice is managed by an operator; and
  send, to a second network element in the network slice, indication information associated with whether the operator manages the network slice and indicating whether first identity information of a terminal should be hidden, wherein the indication information indicating that the network slice is not operated by the operator causes the second network element to determine to hide the first identity information by obtaining second identity information for transmission to a session management network element.

13. The communications apparatus according to claim 12, wherein the communications apparatus is at least one of a slice selection network element, a network repository network element, or an access and mobility management network element.

14. The communications apparatus according to claim 13, wherein the communications apparatus is one of the slice selection network element or the network repository network element; and
  wherein the instructions to send the indication information include instructions to:
    send the indication information to an access and mobility management network element.

15. The communications apparatus according to claim 12, wherein the first parameter comprises at least one of network slice selection assistance information (NSSAI) corresponding to the network slice, a routing area identifier (TAI) of a terminal, or a service type of the terminal.

16. A communications apparatus, wherein the communications apparatus comprises:
  a processor; and
  a non-transitory computer-readable storage medium storing a program to be executed by the processor, the program including instructions to:
    receiving, indication information associated with whether an operator manages a second network slice and indicating whether first identity information of a terminal should be hidden, wherein the communications apparatus is in a first network slice;
    determine, according to the indication information indicating whether the operator manages the second network slice, whether to hide the first identity information of the terminal, wherein the indication information indicating that the second network slice is not operated by the operator causes the communications apparatus to determine to hide the first identity information;
    hide, in response to determining to hide the first identity information of the terminal, the first identity information to obtain second identity information; and
    send the second identity information to a session management network element in the second network slice.

17. The communications apparatus according to claim 16, wherein the communications apparatus is at least one of an access and mobility management network element, a security edge protection proxy, or a visited session management network element.

18. The communications apparatus according to claim 16, wherein the indication information indicates whether first identity information of a terminal should be hidden by indicating at least one of whether a network slice is managed by the operator, whether to hide the first identity information of the terminal, or whether a domain to which a network slice belongs and an operator security domain belong to a same security domain.

19. The communications apparatus according to claim 16, wherein the instructions to hide the first identity information to obtain second identity information include instructions to perform at least one of:
  encrypt the first identity information of the terminal by using a public key, to obtain the second identity information; or
  encrypt the first identity information of the terminal by using a shared key, to obtain the second identity information; or
  obtain a new key based on a shared key and a key derivation function, and encrypt the first identity information of the terminal by using the new key, to obtain the second identity information; or
  randomize the first identity information of the terminal, to obtain the second identity information; or
  use a generalized public user identity (GPSI) corresponding to the first identity information of the terminal as the second identity information.

20. A communications apparatus, comprising:
a processor; and
a non-transitory computer-readable storage medium storing a program to be executed by the processor, the program including instructions for:
  receive, from a session management network element in a first network slice belonging to a first domain, identity information of a terminal and an indication indicating that the identity information of the terminal is hidden identity information, wherein the communications apparatus is in a second network slice belonging to a second domain different from the first domain, and wherein the indication indicating that the identity information of the terminal is hidden identity information is associated with the second network slice not being managed by an operator;
  send, according to the indication, a decryption request to a decryption functional entity, wherein the decryption request comprises the identity information of the terminal, and wherein the decryption request requests decryption of the identity information of the terminal;
  receive decrypted identity information from the decryption functional entity;
  obtain data corresponding to the decrypted identity information; and
  send the data to the session management network element.

* * * * *